(12) United States Patent
Ryu et al.

(10) Patent No.: US 11,016,637 B2
(45) Date of Patent: May 25, 2021

(54) METHOD OF AND DEVICE FOR MANAGING APPLICATIONS

(71) Applicant: SAMSUNG ELECTRONICS CO., LTD., Suwon-si (KR)

(72) Inventors: Jong-hyun Ryu, Suwon-si (KR); Yong-gook Park, Yongin-si (KR); Jang-woo Lee, Seoul (KR); Jae-young Lee, Hwaseong-si (KR); Jae-ho Jung, Yongin-si (KR); Yang-wook Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/706,163

(22) Filed: Dec. 6, 2019

(65) Prior Publication Data

US 2020/0183547 A1 Jun. 11, 2020

Related U.S. Application Data

(63) Continuation of application No. 14/817,290, filed on Aug. 4, 2015, now Pat. No. 10,545,628, which is a (Continued)

(30) Foreign Application Priority Data

Jan. 31, 2013 (KR) .................. 10-2013-0011490
Jul. 18, 2013 (KR) .................. 10-2013-0084930

(51) Int. Cl.
*G06F 3/0482* (2013.01)
*G06F 8/61* (2018.01)
*G06F 3/0481* (2013.01)

(52) U.S. Cl.
CPC .............. *G06F 3/0482* (2013.01); *G06F 8/62* (2013.01); *G06F 3/04817* (2013.01)

(58) Field of Classification Search
CPC ...... G06F 3/0482; G06F 8/62; G06F 3/04817; G06F 3/0488; G06F 3/048
See application file for complete search history.

(56) References Cited

U.S. PATENT DOCUMENTS 6,496,979 B1    12/2002  Chen et al.
9,471,624 B1    10/2016  Patil
(Continued)

FOREIGN PATENT DOCUMENTS

CN    101636720 A    1/2010
CN    102236512 A    11/2011
(Continued)

OTHER PUBLICATIONS

Communication dated Sep. 10, 2018 issued by the Japanese Patent Office in Counterpart Japanese Application No. 2014-012120.
(Continued)

*Primary Examiner* — Jeanette J Parker
(74) *Attorney, Agent, or Firm* — Sughrue Mion, PLLC

(57) ABSTRACT

A device for managing applications installed on the device and a method thereof are provided. The device includes a controller configured to obtain driving information of the applications in response to the applications being executed, and determine an application satisfying an uninstall condition, among the applications, based on the driving information. The device further includes an interface configured to change a display of an object indicating the determined application, based on the uninstall condition.

20 Claims, 37 Drawing Sheets

Related U.S. Application Data continuation-in-part of application No. 14/164,843, filed on Jan. 27, 2014, now Pat. No. 9,778,816.

(56) References Cited

U.S. PATENT DOCUMENTS

| | | |
|---|---|---|
| 2006/0048139 A1 | 3/2006 | Nakamura |
| 2006/0095864 A1 | 5/2006 | Mock et al. |
| 2007/0022320 A1 | 1/2007 | Flocken |
| 2008/0051076 A1 | 2/2008 | O'Shaughnessy et al. |
| 2009/0041230 A1 | 2/2009 | Williams |
| 2010/0017505 A1* | 1/2010 | Kamada .................. G06F 8/62 709/221 |
| 2010/0107150 A1 | 4/2010 | Kamada et al. |
| 2011/0061010 A1 | 3/2011 | Wasko |
| 2011/0306326 A1 | 12/2011 | Reed et al. |
| 2012/0079418 A1 | 3/2012 | Lindsay et al. |
| 2012/0117504 A1 | 5/2012 | Lemay et al. |
| 2012/0129503 A1 | 5/2012 | Lindeman et al. |
| 2012/0260118 A1 | 10/2012 | Jiang et al. |
| 2013/0007662 A1 | 1/2013 | Bank et al. |
| 2013/0125056 A1 | 5/2013 | Suda |
| 2013/0166962 A1 | 6/2013 | Branson |
| 2013/0185373 A1 | 7/2013 | Vandwalle et al. |
| 2013/0196615 A1* | 8/2013 | Zalmanovitch ....... H04M 15/60 455/405 |
| 2014/0201681 A1* | 7/2014 | Mahaffey .......... H04M 1/72569 715/846 |
| 2014/0378111 A1 | 12/2014 | Khorashadi |

FOREIGN PATENT DOCUMENTS

| | | |
|---|---|---|
| EP | 1182554 A2 | 2/2002 |
| JP | 7-13732 A | 1/1995 |
| JP | 2004-355563 A | 12/2004 |
| JP | 2011-246700 A | 12/2011 |
| JP | 2013-105202 A | 5/2013 |
| KR | 10-2012-0057871 A | 6/2012 |
| KR | 10-1291123 B1 | 8/2013 |
| RU | 2237275 C2 | 9/2004 |
| RU | 2336553 C2 | 10/2008 |
| WO | 2008/075447 A1 | 6/2008 |
| WO | 2008/114491 A1 | 9/2008 |

OTHER PUBLICATIONS

International Search Report for PCT/KR2014/000605 dated May 14, 2014 [PCT/ISA/210].

Communication dated May 3, 2016, issued by the European Patent Office in counterpart European Patent Application No. 14153127.7.

Written Opinion for PCT/KR2014/000605 dated May 14, 2014 [PCT/ISA/237].

Communication dated Aug. 1, 2017, issued by the State Intellectual Property Office of P.R.China in counterpart Chinese Application No. 201410044818.3.

Notification of Transmittal of International Search report and Written Opinion for PCT/KR2014/000605 dated May 14, 2014 [PCT/ISA/220].

Communication dated Nov. 30, 2016, issued by the Russian Patent Office in counterpart Russian application No. 2015136859/08.

Communication from the European Patent Office dated Apr. 25, 2014 in a counterpart European Application No. 14153127.7.

Communication dated Dec. 4, 2017 by the Japanese Patent Office in counterpart Japanese Patent Application No. 2014-012120.

Communication dated Apr. 23, 2018 by the Japanese Patent Office in counterpart Japanese Patent Application No. 2014-012120.

Communication dated May 15, 2020 issued by the Indian Patent Office in counterpart Indian Application No. 229/MUM/2014.

* cited by examiner

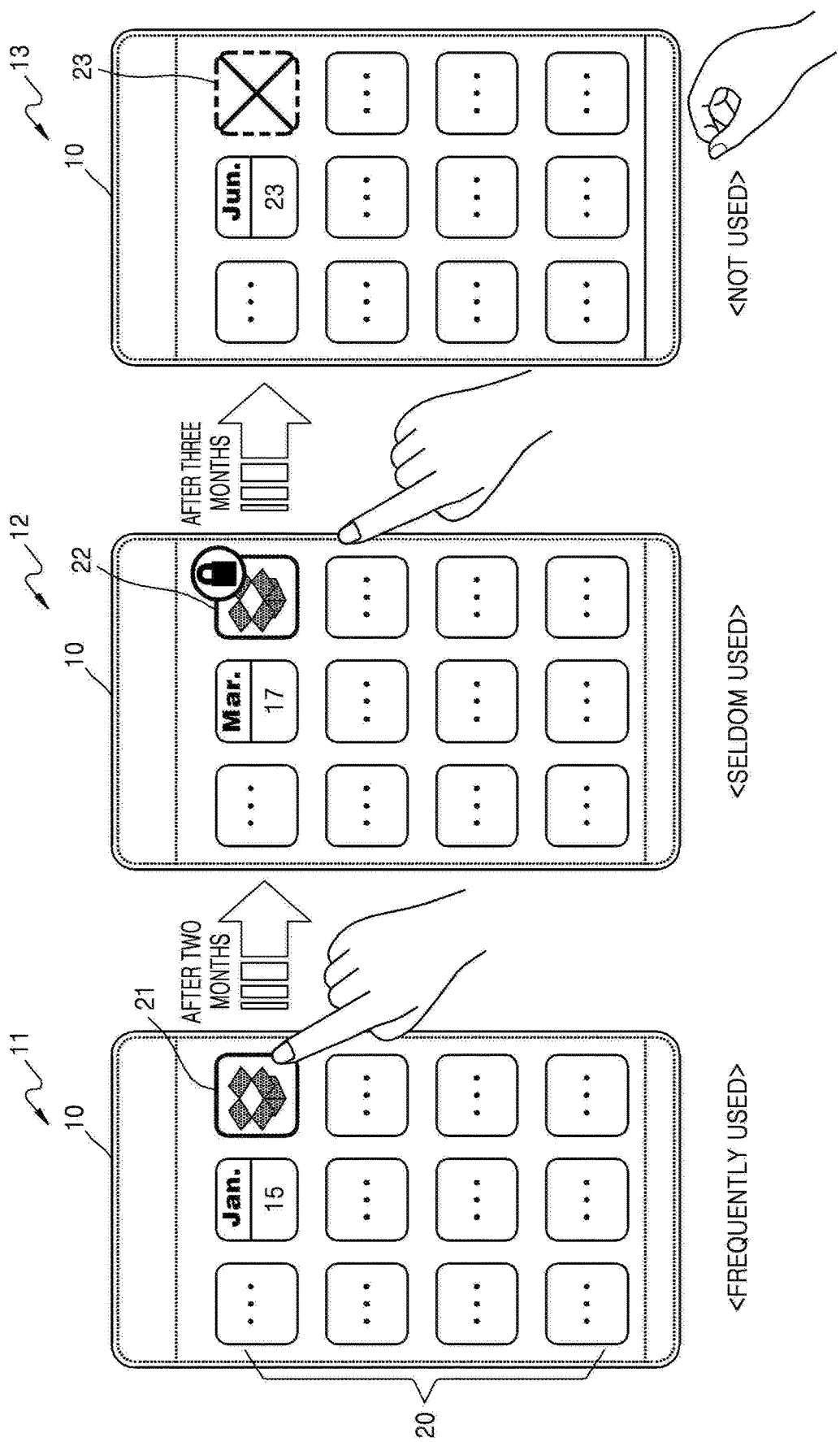

FIG. 3

| | USE FREQUENCY DURING THRESHOLD TIME | UNUSED NUMBER OF TIMES AT CERTAIN POINT OF TIME | AVERAGE USE | UNINSTALL LEVEL | USED LOCATION | CONNECTION FREQUENCY TO ANOTHER DEVICE | ⋮ |
|---|---|---|---|---|---|---|---|
| FIRST APPLICATION | 0 TIMES | 4 TIMES | 0 hour | 2 | | | ⋮ |
| SECOND APPLICATION | 2 TIMES | 1 TIME | 0.2 hour | 1 | GANGNAM | | ⋮ |
| THIRD APPLICATION | 38 TIMES | 0 TIMES | 3.2 hour | 0 | | | ⋮ |
| FOURTH APPLICATION | 0 TIMES | 0 TIMES | 0 hour | 1 | | 0 TIMES | ⋮ |
| ⋮ | ⋮ | ⋮ | ⋮ | ⋮ | ⋮ | ⋮ | |

FIG. 5

| | | DEVICE | SERVER/CLOUD |
|---|---|---|---|
| FIRST UNINSTALL LEVEL | APP | ICON, EXECUTION FILE, APP METADATA(APP TITLE, APP VERSION, APP INSTALLATION MARKET LINK), USER DATA(LOGIN ID/PASSWD, SESSION INFORMATION), APP DATA, (CONFIGURATION DATA, DATA REQUIRED WHILE USING APP, LOG/TRANSACTION/HISTORY) | NONE |
| | CONTENT | ORIGINAL CONTENT | NONE |
| | SERVICE | ICON, SERVICE LINK, USER DATA(LOGIN ID/PASSWD, SESSION INFORMATION) | NONE |
| SECOND UNINSTALL LEVEL | APP | ICON, APP METADATA(APP TITLE, APP VERSION, APP INSTALLATION MARKET LINK), SERVER BACKUP DATA LINK | USER DATA(LOGIN ID/PASSWD, SESSION INFORMATION), APP DATA(CONFIGURATION DATA, DATA REQUIRED WHILE USING APP, LOG/TRANSACTION/HISTORY) |
| | CONTENT | CONTENT THUMBNAIL(PHOTO, IMAGE, MOVIE ETC), CONTENT SUMMARY(TEXT, WEB PAGE, PDF/DOC ETC), SERVER BACKUP DATA LINK | ORIGINAL CONTENT |
| | SERVICE | ICON, SERVICE LINK, SERVER BACKUP DATA LINK | USER DATA(LOGIN ID/PASSWD, SESSION INFORMATION) |
| THIRD UNINSTALL LEVEL | APP | NONE | NONE |
| | CONTENT | NONE | NONE |
| | SERVICE | NONE | NONE |

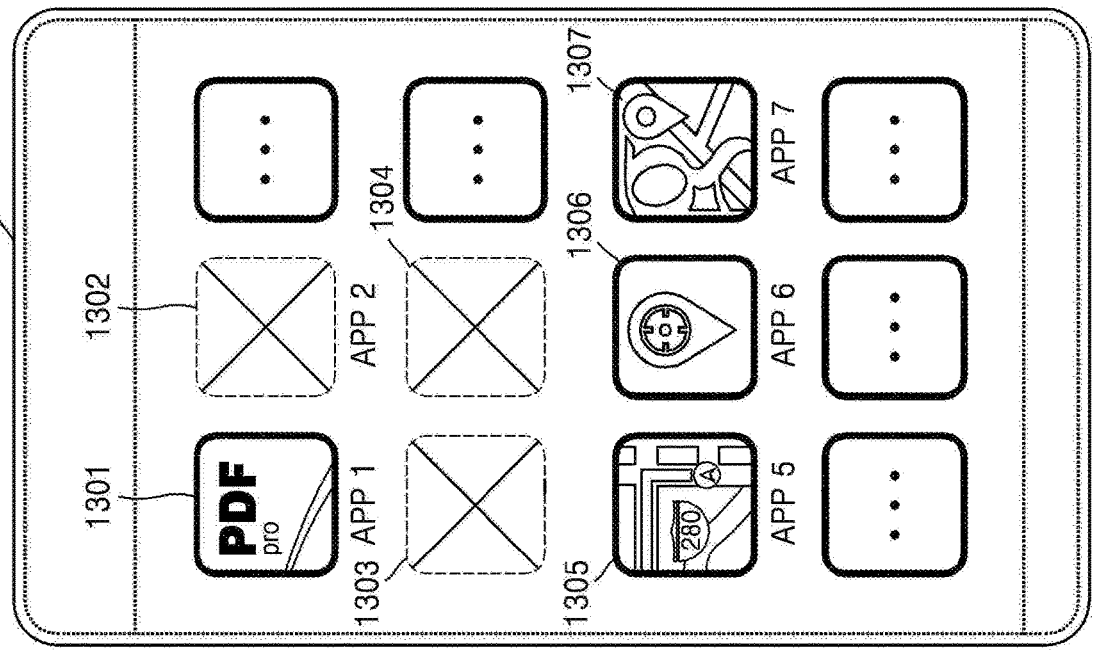
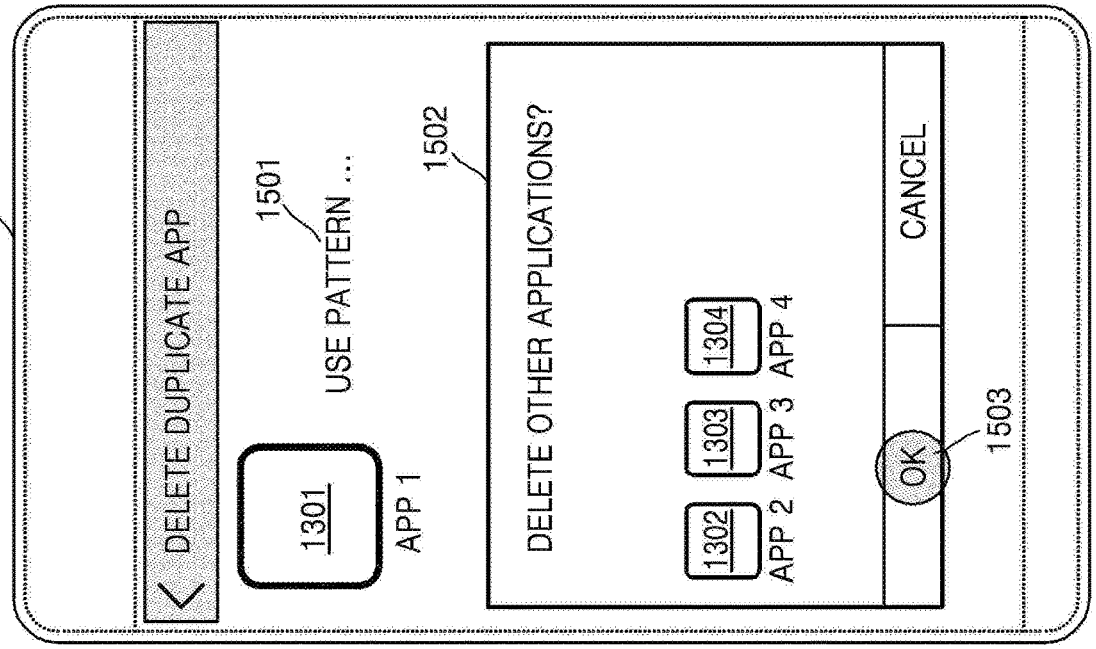
FIG. 15A

FIG. 15B
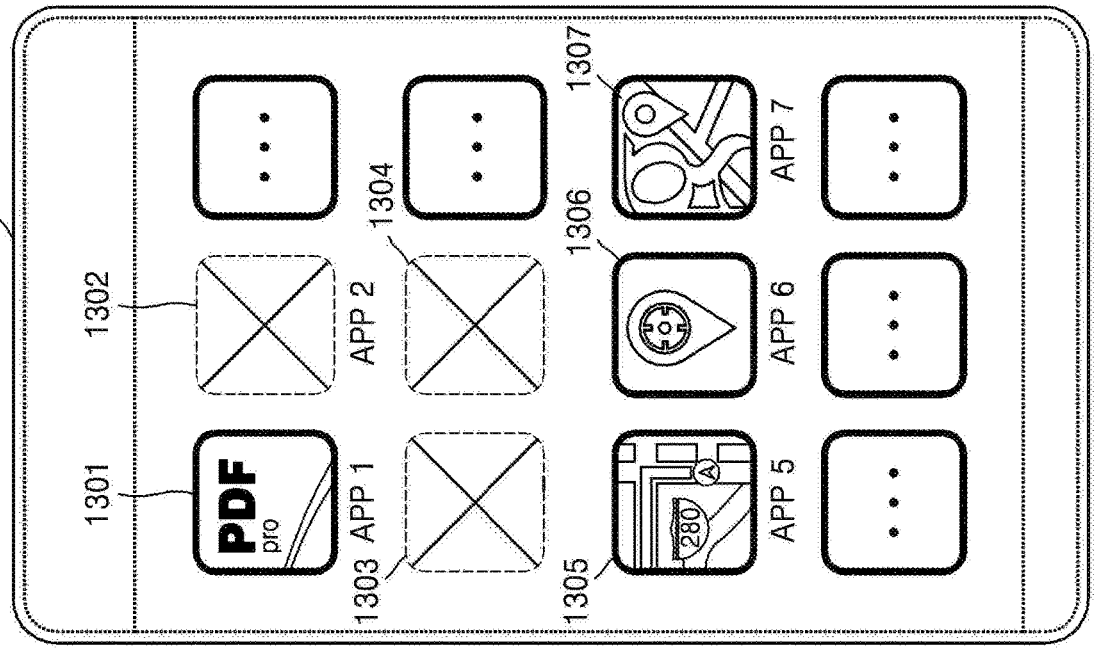
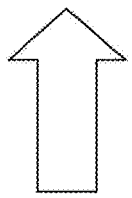
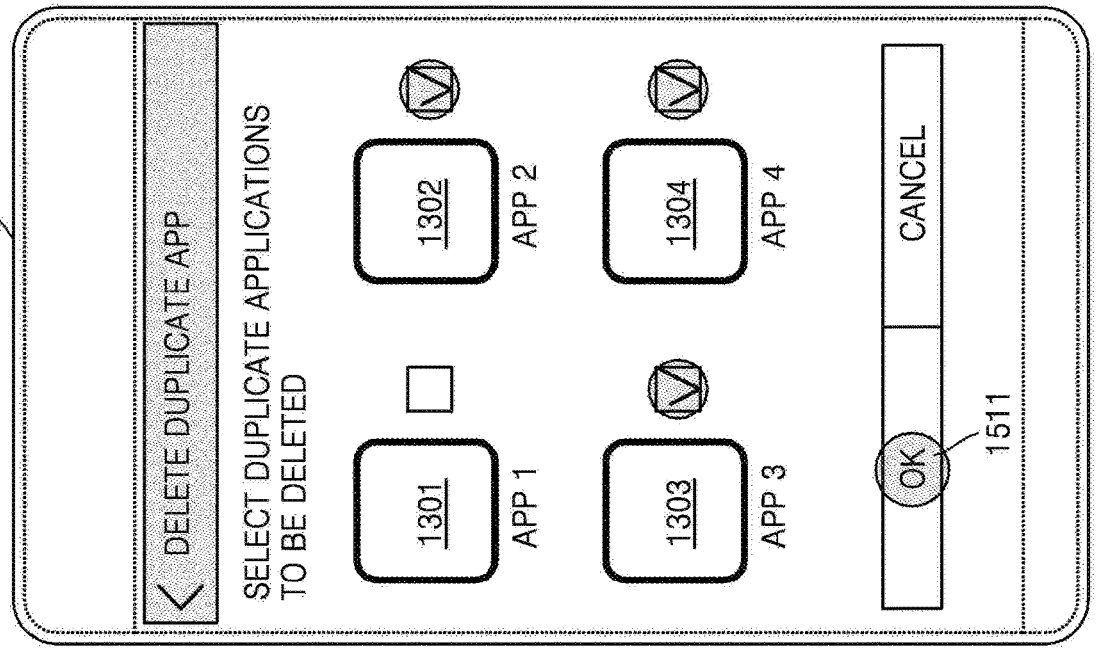

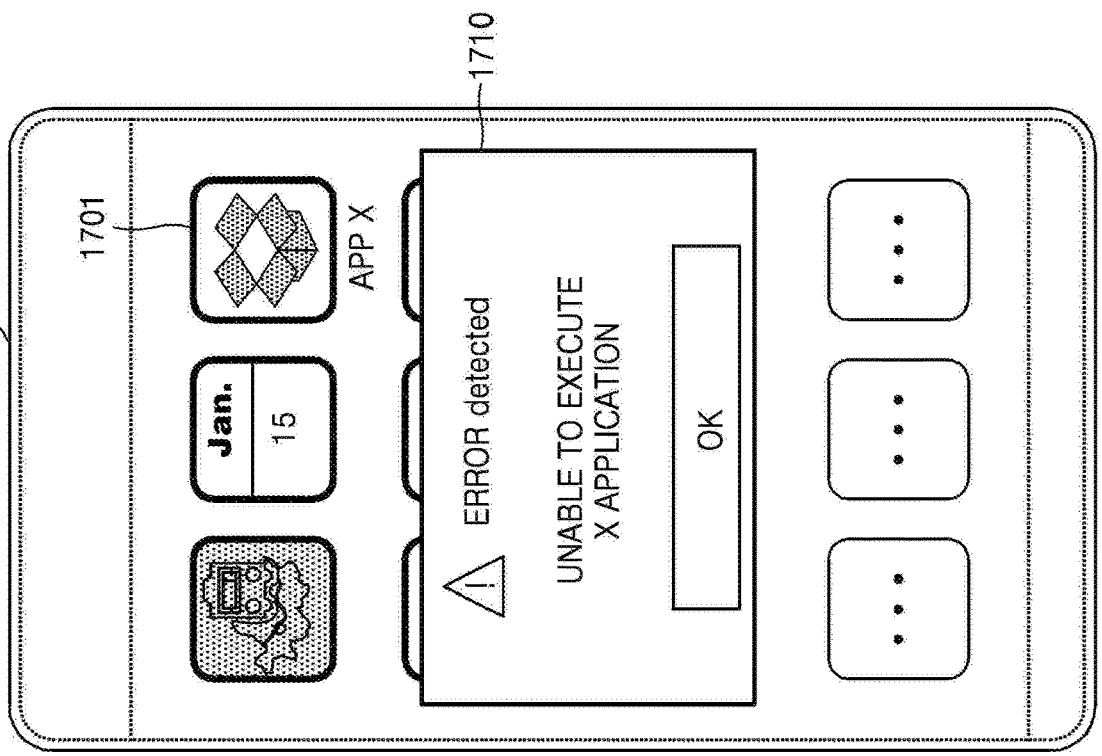
FIG. 17
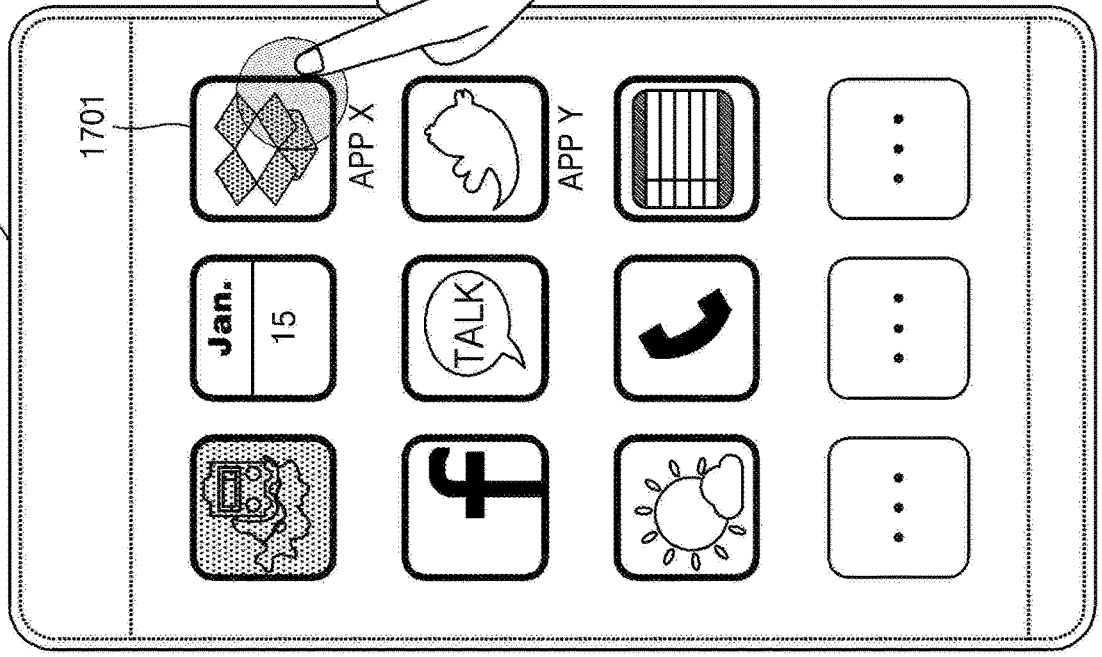

FIG. 18

|  | NUMBER OF TIMES ERROR IS GENERATED | TIMES WHEN ERRORS ARE GENERATED | ERROR GENERATION FREQUENCY | THRESHOLD VALUE 1810 | ... |
|---|---|---|---|---|---|
| APP X | 10 TIMES | 2015-01-01; 2015-01-02; 2015-01-03; ... | 10 TIMES/ WEEK | 10 TIMES/ WEEK | ... |
| APP Y | 2 TIMES |  | 2 TIMES/ WEEK | 20 TIMES/ WEEK | ... |
| ... | ... | ... | ... |  | ... |

METHOD OF AND DEVICE FOR MANAGING APPLICATIONS

CROSS REFERENCE TO RELATED APPLICATIONS

This application is a continuation of U.S. patent application Ser. No. 14/817,290, filed Aug. 4, 2015, which is a continuation-in-part application of U.S. application Ser. No. 14/164,843, filed on Jan. 27, 2014, now U.S. Pat. No. 9,778,816, which claims priority from Korean Patent Application No. 10-2013-0011490, filed on Jan. 31, 2013, and Korean Patent Application No. 10-2013-0084930, filed on Jul. 18, 2013, in the Korean Intellectual Property Office, the disclosures of which are incorporated herein by reference in their entireties.

BACKGROUND

1. Field

Methods, and apparatuses consistent with exemplary embodiments relate to managing applications.

2. Description of the Related Art

Mobile (portable) devices, such as smart phones, tablet devices, and personal digital assistants (PDAs), are in wide use worldwide. Like in the case of other devices, such as personal computers (PCs) and laptops, the users may directly install various types of applications on the mobile devices. Accordingly, the users may be able to perform various operations, for example, they may watch content, such as a moving images or a picture, manage a personal schedule, write an email, play a game, etc. However, because the storage capacity of these devices is limited, the number of applications that can be installed is limited as well. Also, if many applications are installed, it may be difficult to find and delete select applications one by one. Thus, a method of efficiently managing applications in a mobile device may be implemented.

SUMMARY

One or more exemplary embodiments provide a method of and device for of managing applications and a device for managing applications. Also, one or more exemplary embodiments provide a computer-readable recording medium having recorded thereon the method.

According to an aspect of an exemplary embodiment, there is provided a device for managing applications installed on the device, the device including a controller configured to obtain driving information of the applications in response to the applications being executed, and determine an application satisfying an uninstall condition, among the applications, based on the driving information. The device further includes an interface configured to change a display of an object indicating the determined application, based on the uninstall condition.

The driving information may include a use history of each of the applications.

The uninstall condition may include conditions in respective stages indicating respective degrees in which an application is unused, and the controller may be further configured to determine a stage among the stages, of a condition among the conditions that is satisfied by the determined application, based on the use history.

The interface may be further configured to change the object to a visual representation of a different type based on the determined stage.

The uninstall condition may include at least one among a condition in which an application is unused for a period of time, a condition in which an application is repeatedly unused a number of times or more until a point of time, a condition in which the device is located outside a range of distance, and a condition in which an application is unshared with another device for a period of time.

The interface may be further configured to receive a request for managing duplicate applications, and the controller may be further configured to determine the duplicate applications among the applications, based on the driving information, in response to the interface receiving the request.

The driving information may include at least one among an extension of a file that is processed by the applications and a function that is performed by the applications, and the uninstall condition may include a condition in which applications processing a file of a same extension or applications performing a same function are the duplicate applications.

The controller may be further configured to uninstall at least one of the duplicate applications.

The driving information may include an error generation history of each of the applications.

The interface may be further configured to receive a request for managing an error application, and the controller may be further configured to determine the error application among the applications, based on the error generation history, in response to the interface receiving the request.

The controller may be further configured to determine the error application having an error generation frequency exceeding a value, among the applications, and uninstall the determined error application.

The device may be set as a master device, and the controller may be further configured to receive, from another device that corresponds to a slave device and is synchronizable with the master device, driving information of a first application installed on the other device.

The controller may be further configured to determine whether the first application satisfies the uninstall condition, based on the driving information of the first application, and control the other device to change a display of another object indicating the first application, based on the uninstall condition, in response to the controller determining that the first application satisfies the uninstall condition.

According to an aspect of another exemplary embodiment, there is provided a method of managing applications installed on a device, the method including obtaining driving information of the applications in response to the applications being executed, and determining an application satisfying an uninstall condition, among the applications, based on the driving information. The method further includes changing a display of an object indicating the determined application, based on the uninstall condition.

The driving information may include a use history of each of the applications, the uninstall condition may include conditions in respective stages indicating respective degrees in which an application is unused, and the determining may include determining a stage among the stages, of a condition among the conditions that is satisfied by the determined application, based on the use history.

The method may further include receiving a request for managing duplicate applications, determining the duplicate applications among the applications, based on the driving information, in response to the receiving the request, and uninstalling at least one of the duplicate applications.

The driving information may include an error generation history of each of the applications, and the method may further include receiving a request for managing an error application, determining the error application having an error generation frequency exceeding a value, among the applications, in response to the receiving the request, and uninstalling the determined error application.

The device may be set as a master device, and the method may further include receiving, from another device that corresponds to a slave device and is synchronizable with the master device, driving information of a first application installed on the other device, determining whether the first application satisfies the uninstall condition, based on the driving information of the first application, and controlling the other device to change a display of another object indicating the first application, based on the uninstall condition, in response to the determining that the first application satisfies the uninstall condition.

A non-transitory computer-readable storage medium may store a program including instructions to cause a computer to perform the method.

According to an aspect of another exemplary embodiment, there is provided a device for managing applications installed on the device, the device including a controller configured to obtain execution information of the applications, and determine an application being a duplicate application, an error application, or an unused application, among the applications, based on the execution information. The device further includes an interface configured to change an icon of the determined application, the changed icon indicating the determined application is the duplicate application, the error application, or the unused application.

The controller may be further configured to determine, as the duplicate application, the application processing a file of a same extension or performing a same function as another application, among the applications, based on the execution information.

The controller may be further configured to determine, as the error application, the application generating an error at a frequency exceeding a value, among the applications, based on the execution information.

The controller may be further configured to determine the application as the unused application, based on a frequency of use of the application that is included in the execution information.

BRIEF DESCRIPTION OF THE DRAWINGS

These and/or other aspects will become apparent and more readily appreciated from the following description of the exemplary embodiments, taken in conjunction with the accompanying drawings in which:

FIGS. 1A and 1B are diagrams showing use patterns of a user using applications installed on a device, according to an exemplary embodiment;

FIG. 3 is a table showing a result of a monitor monitoring use histories of applications installed on a device, according to an exemplary embodiment;

FIG. 5 is a table for describing uninstall operations performed at each uninstall level, according to an exemplary embodiment;

FIG. 15A is a diagram for describing a UI for deleting the duplicate applications of FIG. 14, according to an exemplary embodiment;

FIG. 15B is a diagram for describing a UI for deleting the duplicate applications of FIG. 14, according to another exemplary embodiment;

FIG. 17 is a diagram for describing a UI for indicating that an error is generated while executing an application, according to an exemplary embodiment;

FIG. 18 is a table including error generation histories of applications, according to an exemplary embodiment;

DETAILED DESCRIPTION OF THE EXEMPLARY EMBODIMENTS

Figure 1B:
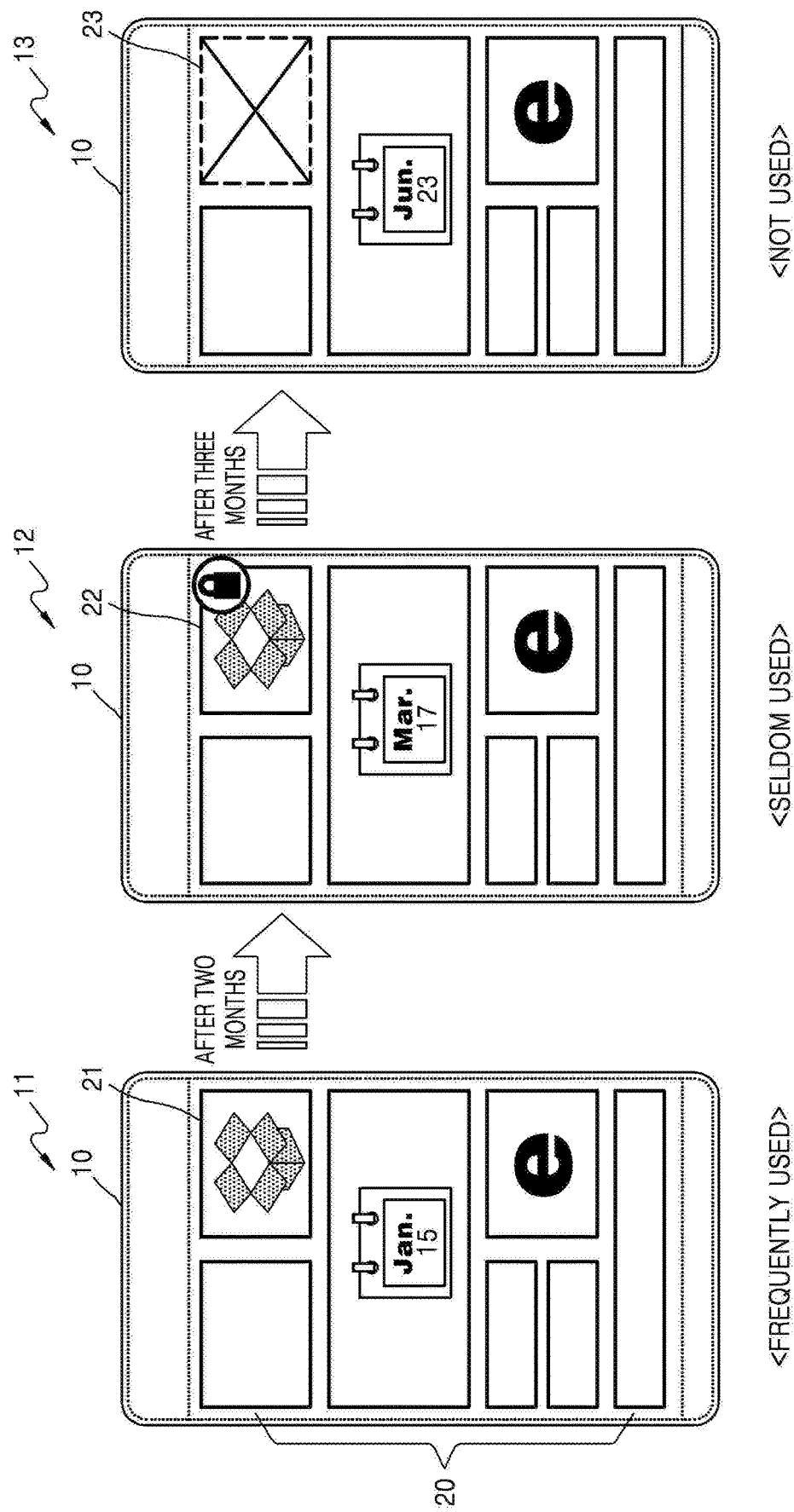

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein.

Particular exemplary embodiments will be illustrated in the drawings and described in detail in the written description. However, this is not intended to limit the present exemplary embodiments to particular modes of practice, and it will to be appreciated that all changes, equivalents, and substitutes that do not depart from the spirit and technical scope are encompassed. In the description, certain detailed explanations of related art are omitted when it is deemed that they may unnecessarily obscure the essence of the one or more exemplary embodiments.

As used herein, the term "and/or" includes any and all combinations of one or more of the associated listed items. Expressions such as "at least one of," when preceding a list of elements, modify the entire list of elements and do not modify the individual elements of the list.

While such terms as "first," "second," etc., may be used to describe various components, such components must not be limited by the above terms. The above terms are used only to distinguish one component from another.

All terms including descriptive or technical terms which are used herein should be construed as having meanings that are known to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

A "device" mentioned throughout one or more exemplary embodiments may be a smart phone, a mobile phone, a personal digital assistant (PDA), a laptop, a media player, a global positioning system (GPS), or another mobile or non-mobile computing device, but is not limited thereto. It will be readily understood by one of ordinary skill in the art that the device may alternatively be any one of various devices capable of receiving a touch input, such as an electronic blackboard or a touch table.

Information inputtable to a device according to one or more exemplary embodiments includes user input information, and for example, may be touch-based user input information. The touch-based user input information may be a request of the user, a selection of the user, such as selection of one piece of application-related information being displayed, or a command of the user, such as a delete command based on application-related information being displayed, but is not limited thereto.

A touch-based input may be dependent on a touch-based gesture of a user. Examples of the touch-based gesture include tap (or touch), long tap (or long touch), touch and hold, touch and drag, double tap, drag, panning, flick, drag and drop, and sweep, but are not limited thereto.

An input is not limited to the touch-based gesture. For example, the input may be motion-based or vision-based.

A motion-based input may be based on a gesture of a user based on moving a device, for example, shaking or hitting the device. For example, a gesture of tilting the device to a location where a virtual space that will be described later is displayed or of hitting the device twice may be set as an input for requesting to register selected application-related information in the virtual space.

A vision-based input may be based on a gesture of a user recognized by analyzing an input image obtained by using a camera, without having to contact a device. For example, a space gesture of making a V sign by using an index finger and a middle finger may be set as an input for requesting to delete application related information in a virtual space that will be described later.

One or more exemplary embodiments will now be described in detail with reference to accompanying drawings.

FIGS. 1A and 1B are diagrams showing use patterns of a user using applications 20 installed on a device 10, according to an exemplary embodiment.

Referring to FIG. 1A, use patterns of the user on a date 11 dated January 15, a date 12 dated March 17th, and a date 13 dated June 23rd are described, but these dates are only examples and are not limited thereto. Also, user interfaces (UIs) shown in FIG. 1B are in slightly different tile shapes from UIs in FIG. 1A, and thus descriptions on FIG. 1A may also apply to FIG. 1B. In other words, various UIs of the device 10 may exist other than those shown in FIG. 1A, and one or more exemplary embodiments may include various UIs.

Various types of the applications 20 may be pre-installed on the device 10 or are installed by the user. Also, a list of the applications 20 may be displayed on the UI of the device 10.

In one or more exemplary embodiments, the applications 20 denote a series of computer program (software) groups designed to perform certain operations. Accordingly, since one of ordinary skill in the art will readily understand that examples of the applications 20 described herein include a game application, a utility application, a musical instrument playing application, a moving image reproducing application, a map application, a broadcast application, an exercise supporting application, a payment application, etc., details thereof will be omitted herein.

Referring to FIG. 1A, based on the use pattern on the date 11 dated January fifteenth, it may be assumed that a first application 21 from among the applications 20 installed on the device 10 is frequently used.

However, based on the use pattern on the date 12 dated March 17th that is two months after the date 11 dated January 15th, it is assumed that a first application 22 is seldom used compared to the first application 21.

Moreover, based on the use pattern on the date 13 dated June 23rd that is three month after the date 12 dated March 17th, it is assumed that a first application 23 is not used at all.

As such, an application from among the applications 20 installed on the device 10 may be initially frequently used but gradually used less and less as the user's interest fades away, like the first application 21.

General devices, such as smart phones and mobile phones, only manage installation of applications, and do not separately manage how the applications are used or which applications are currently not used or seldom used.

In detail, according to an increase in types of applications directly installable on devices, such as smart phones and mobile phones, it may be difficult for the user to manage the applications simultaneously. Also, because storage capacities of the devices are limited, if many applications are installed, the storage capacities may not be sufficient to additionally store other information. Moreover, if the user wants to delete applications that are no longer used or unnecessary, it may be inconvenient for the user to delete the applications one by one.

According to the current embodiment, the device 10 may have a function of monitoring and separately managing the first application 21 that is seldom used or not used, unlike other applications 20. In detail, according to the current exemplary embodiment, the device 10 has a function of performing operations for managing the first application 21 in stages, for example, uninstall operations.

For example, as described above, the first application 21 is frequently used on the date 11 dated January 15th, but the first application 22 is seldom used on the date 12 dated March 17th that is two months after the date 11 dated January 15th.

The device 10 monitors a use history of the user on the first application 21 or 22 between the date 11 dated January 15th and the date 12 dated March 17th. If it is monitored that the first application 22 is not frequently used on the date 12 dated March 17th, the device 10 performs an uninstall operation corresponding to a certain uninstall level on the first application 22, and displays identification information indicating that the first application 22 is at the certain uninstall level.

Here, in order to indicate that the first application 22 is at the certain uninstall level on the date 11 dated March 17th, the device 10 may insert and display a padlock symbol on an icon of the first application 22. Accordingly, the user may immediately recognize that the first application 22 is not frequently used.

Then, the device 10 monitors the use pattern of the user on the first application 22 or 23 between the date 12 dated March 17th and the date 13 dated June 23rd. If it is monitored that the first application 23 is no longer used on the date 13 dated June 23rd, the device 10 may perform an uninstall operation corresponding to another uninstall level higher than the certain uninstall level on the date 12 dated March 17th on the first application 23. For example, the device 10 may perform an uninstall operation of completely deleting all data related to the first application 23 on the date 13 dated June 23rd.

Generally, the term "uninstall" includes only a process of completely deleting an application. However, in one or more exemplary embodiments, the term "uninstall" includes uninstall operations in stages for changing an indication (visual representation) of an application or for deleting or erasing data of the application. In other words, the meaning of "uninstall" is not limited to a general meaning in one or more embodiments, as will be described in detail later.

Hereinafter, structures, functions, and operations of the device 10 for managing the applications 20 installed on the device 100 will be described in detail.

Figure 2:
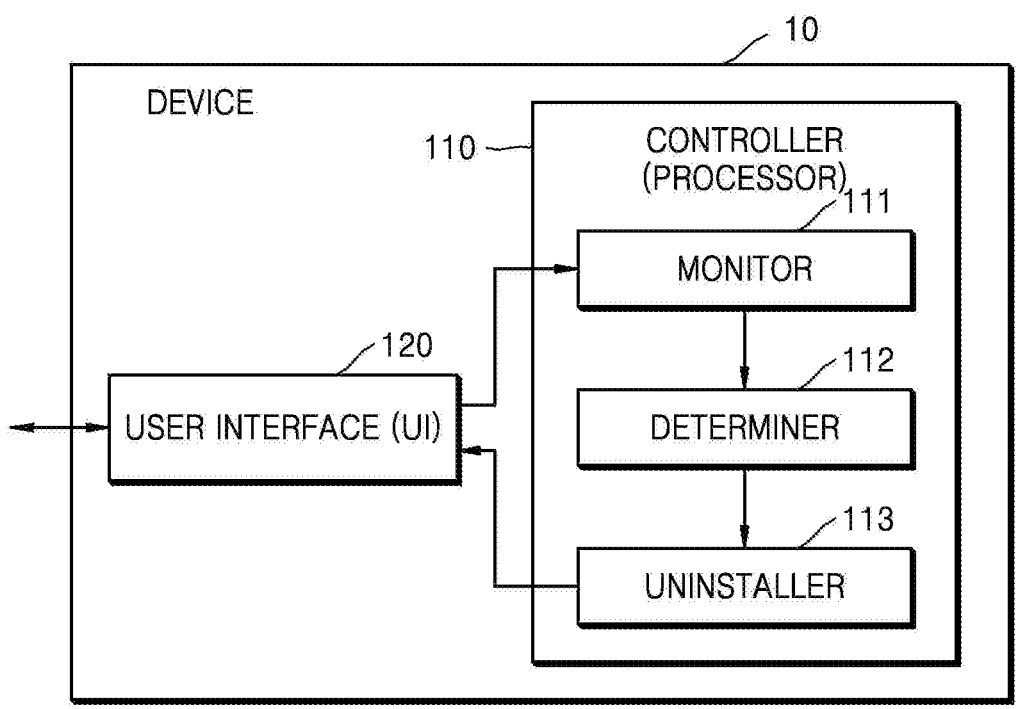
FIG. 2 is a block diagram of a device for managing applications, according to an exemplary embodiment.

FIG. 2 is a block diagram of the device 10 for managing applications, according to an exemplary embodiment. Referring to FIG. 2, the device 10 may include a controller 110 and a user interface (UI) 120.

For clarity, only hardware components related to the current embodiment will be described in FIG. 2. However, it will be readily understood by one of ordinary skill in the art that general-use hardware components other than those shown in FIG. 2 may also be included in the device 10.

Referring to FIG. 2, the controller 110 may include a monitor 111, a determiner 112, and an uninstaller 113. In the device 10, the controller 110 may correspond to a processor, such as a central processing unit (CPU). The processor may be realized by using an array of a plurality of logic gates or may be a general use microprocessor. In other words, the processor may be realized in any shape of hardware or software module.

The monitor 111 may monitor a use history of each application installed on the device 10. The use history may be defined as a concept including use patterns or use habits accumulated with respect to locations or times of using the application.

In detail, the monitor 111 may monitor how often the application has been used during a threshold time pre-set through the device, or how many times the application has not been used until a pre-set point of time. In other words, the monitor 111 may monitor the use history by collecting information about a use habit and use frequency of each application.

As shown in FIG. 3, the monitor 111 may manage a monitoring result according to applications. In other words, the monitor 111 may monitor different texts of applications, such as use frequencies, used locations, and people using (sharing) corresponding applications, according to types of applications.

FIG. 3 is a table showing a result of the monitor 111 monitoring use histories of applications installed on the device 10, according to an exemplary embodiment.

Referring to FIG. 3, uninstall conditions for determining an uninstall level include a condition wherein an application is not used for a pre-set threshold time, a condition wherein an unused state of an application is repeated a threshold number of times or more until a pre-set point of time, a condition wherein a location of the device 10 is outside a pre-set range, and a condition wherein an application is not shared with another device for a threshold time. However, it will be readily understood by one of ordinary skill in the art that the uninstall conditions may include other similar conditions for monitoring whether an application is used by using the monitored use history.

The monitor 111 may monitor that a use frequency of a first application is 0 times, a use frequency of a second application is 2 times, a use frequency of a third application is 38 times, and a use frequency of a fourth application is 0 times during a threshold time pre-set in the device 10. Here, the pre-set threshold time may be directly set by the user by manipulating the device 10 or may be a default value assigned in an operating system (OS) of the device 10.

Also, the monitor 111 may monitor that an unused number of times of the first application is 4 times, an unused number of times of the second application is 1 time, an unused number of times of the third application is 0 times, and an unused number of times of the fourth application is 0 times at a certain point of time pre-set in the device 10. Here, similarly, the pre-set certain point of time may be directly set by the user by manipulating the device 10, or may correspond to a default value assigned by the OS of the device 10.

Also, the monitor 111 may monitor an average time of using each of the first through fourth applications.

Moreover, the monitor 111 may monitor a place the second application is mostly used, unlike the first, third, and fourth applications. In other words, the monitor 111 may monitor that the place the second application is mostly used is, for example, Gangnam, Seoul. Also, by continuously monitoring the place where the device 10 is currently located, the monitor 111 may monitor that the second application is seldom used or not used at all in areas other than Gangnam.

Also, the monitor 111 may monitor that the fourth application is an application used only when connected to another device in a wireless communication manner, such as Bluetooth or Wi-Fi direct, unlike the first, second, and third applications. Thus, the monitor 111 may monitor the use history of the fourth application by also monitoring a connection frequency to the other device via wireless communication.

Referring back to FIG. 2, the determiner 112 determines at least one application satisfying the pre-set uninstall conditions from among the applications installed in the device 10, based on the monitored use histories as shown in FIG. 3.

In other words, the determiner 112 may determine at least one application corresponding to at least one uninstall level from among a plurality of uninstall levels, based on the monitored use histories. Also, the determiner 112 may additionally determine an uninstall level corresponding to an application determined based on the monitored use histories.

The uninstall conditions may include detailed conditions in stages for classifying uninstall levels to be applied to applications based on a degree of not using the applications. In detail, when the uninstall conditions are satisfied, visual representations of the applications may also be changed, and thus, the uninstall conditions may also be referred to as display state change conditions.

According to the current exemplary embodiment, for convenience of description, the uninstall levels include three levels, i.e., a first uninstall level, a second uninstall level, and a third uninstall level. However, it will be readily understood by one of ordinary skill in the art the uninstall levels may include two or more uninstall levels by subdividing or combining uninstall operations included in the three uninstall levels described below.

One of the reasons that the uninstall conditions may be subdivided to include detailed conditions in stages is to change an indication (or a visual representation) of an application in stages or to delete data until an unused application is finally completely deleted.

An exemplary embodiment when the uninstall condition is a condition wherein an application is not used for a pre-set threshold time as described above will now be described. In this exemplary embodiment, it may be assumed that the pre-set threshold time is one month but is not limited thereto.

When it is determined that the first application, for example, the first application 21 of FIG. 1A, is not used for one month that is the threshold time based on the monitoring result of the monitor 111, the determiner 112 may determine that the first application is at the first uninstall level, which is a lowest uninstall level, after one month.

After it is determined that the first application is at the first uninstall level, when it is determined that the first application is again not used for one month based on the monitoring result of the monitor 111, the determiner 112 may determine that the first application is at the second uninstall level that is a next uninstall level after another one month (total two months).

After it is determined that the first application is at the second uninstall level, and when it is determined that the first application is continuously not used for one month based on the monitoring result of the monitor 111, the determiner 112 may determine that the first application is at the third uninstall level that is a last uninstall level after another one month (total three months). As will be described above, in one or more embodiments, in the third uninstall level, an uninstall operation of completely deleting the first application may be performed. As a result, the first application at the third uninstall level may be permanently removed from the device 10.

Alternatively, an exemplary embodiment where the uninstall condition is a condition wherein an unused state of an application is repeated a threshold number of times up to a pre-set point of time will now be described. In this exemplary embodiment, it may be assumed that the pre-set point of time is after one week and the threshold number of times is 4. Meanwhile, the pre-set point of time may be arbitrarily set based on a use history of an application used by the user in the device 10. Alternatively, the pre-set point of time may be directly set by the user.

When it is determined that the first application, for example, the first application 21 of FIG. 1A, is not used for four weeks based on the monitoring result of the monitor 111, the first application is repeated 4 times that is the threshold number of times. As a result, the determiner 112 determines that the first application is at the first uninstall level that is the lowest uninstall level, at the point of time after 4 weeks.

However, on the other hand, if 4 weeks are passed and the first application is used once only at the third week, the threshold number of times of 4 times is not satisfied, and thus the first application may not be in the first uninstall level.

After it is determined that the first application is at the first uninstall level, when it is determined that the first application is again not used for 4 weeks based on the monitoring result of the monitor 111, the determiner 112 may determine that the first application is at the second uninstall level that is a next uninstall level at a point of time after another 4 weeks (total 8 weeks).

After it is determined that the first application is at the second uninstall level, when it is determined that the first application is continuously not used for 4 weeks based on the monitoring result of the monitor 111, the determiner 112 may determine that the first application is at the third uninstall level that is a last uninstall level at a point of time after another 4 weeks (total 12 weeks).

In this exemplary embodiment, even when the first application is at the first or second uninstall level, the first or second uninstall level may be canceled whenever the user starts to frequently use the first application again. However, if the third uninstall level is applied and the first application is completely deleted, the user may have to install the first application again on the device 10.

An exemplary embodiment where the uninstall condition is a condition wherein the location of the device 10 is outside the pre-set place will now be described with reference to FIG. 4.

Figure 4:
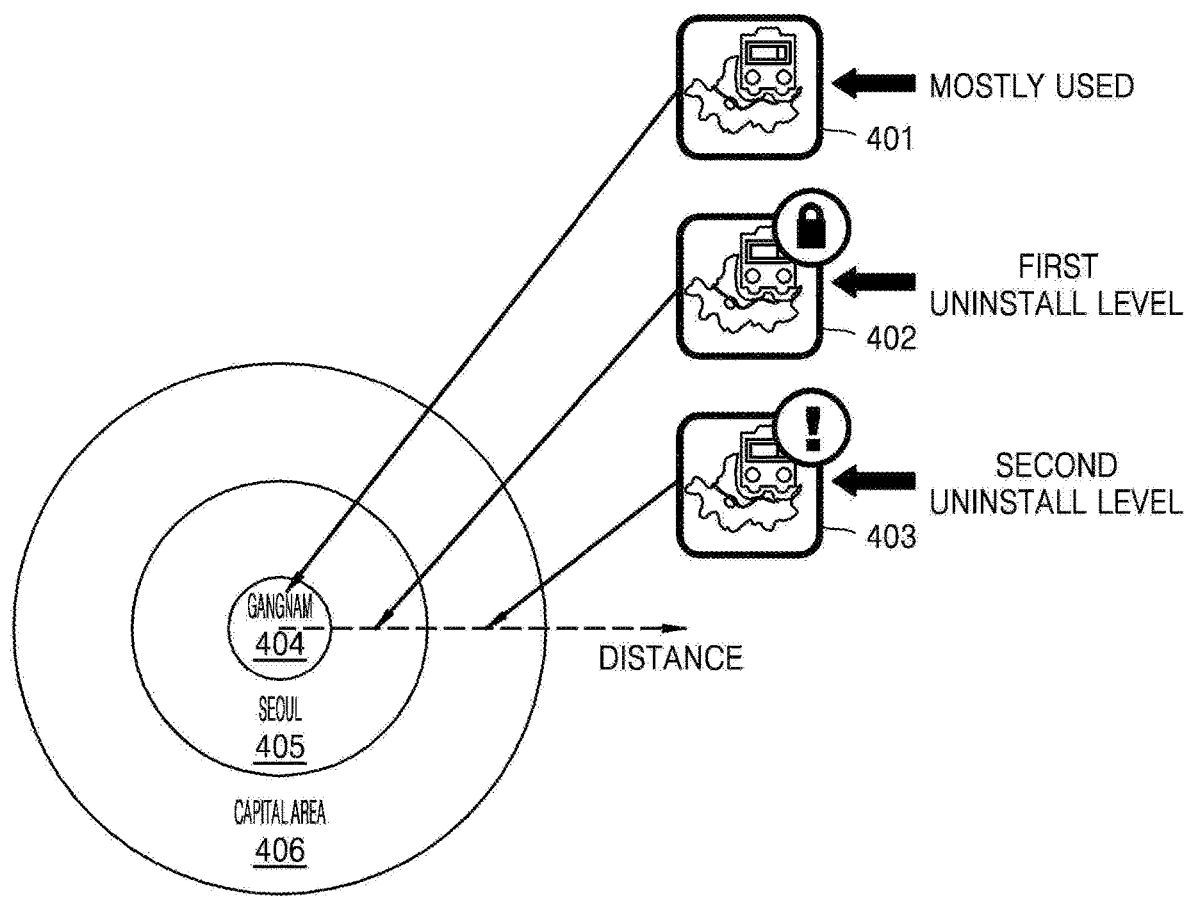
FIG. 4 is a diagram for describing uninstalling of an application according to a location of a device, according to an exemplary embodiment.

FIG. 4 is a diagram for describing uninstalling of an application according to the location of the device 10, according to an exemplary embodiment.

The monitor 111 may, for example, monitor that a place where a bus application 401 is mostly used is Gangnam 404 in Seoul 405. For example, when it is assumed that the bus application 401 is an application for showing bus routes and times within Gangnam 404, the bus application 401 may not be used in Seoul 405 and a capital area 406 other than Gangnam 404.

Upon monitoring the location of the device 10 of FIG. 2, the monitor 111 may monitor that the device 10 is outside Gangnam 404 but still within Seoul 405 at a certain point of time. At this time, the determiner 112 may determine that a bus application 402 is at the first uninstall level that is a lowest uninstall level.

However, upon monitoring the location of the device 10, the monitor 111 may monitor that the device 10 is in the capital area 406 of Seoul 405. At this time, the determiner 112 may determine that a bus application 403 is at the second uninstall level that is a next uninstall level.

However, when the device 10 is again within Seoul 405 based on the monitoring result of the monitor 111, the bus application 403 at the second uninstall level may be restored to the bus application 402 at the first uninstall level. Also, when the device 10 is again in Gangnam 404 based on the monitoring result of the monitor 111, the bus application 402 at the first uninstall level may be restored to the bus application 401 without any uninstall level.

Referring back to FIG. 2, an exemplary embodiment where the uninstall condition is a condition wherein an application is not shared with another device for a threshold time will now be described. Here, it may be assumed that the threshold time is one month.

For example, it may be assumed that the fourth application in FIG. 3 is a game application used only when the device 10 and another device are connected in a wireless communication manner, such as Bluetooth or Wi-Fi direct. In other words, the fourth application cannot be executed by the device 10 only.

The monitor 111 may monitor the use history of the fourth application by monitoring the use frequency of the fourth application and the connection frequency to the other device in a wireless communication manner. As a result, the monitor 111 may monitor that the connection frequency is 0 times for one month of the threshold time. In this case, the determiner 112 may determine that the fourth application is at the first uninstall level.

After the fourth application is determined to be at the first uninstall level, when the monitor 111 monitors that the connection frequency of the fourth application to the other device is again 0 times for one month, the determiner 112 may determine that the fourth application is at the second uninstall level that is a next uninstall level at a point of time after another one month (total two months).

However, even when the fourth application is at the first or second uninstall level, the first or second uninstall level may be canceled at any time when the fourth application is frequently used by being connected to the other device in a wireless communication manner.

As a result, when the uninstall condition is a condition wherein an application is not used for a pre-set threshold time, the determiner 112 determines at least one application that is not used for the pre-set threshold time based on monitoring results.

Alternatively, when the uninstall condition is a condition wherein an unused state of an application is repeated a threshold number of times or more until a pre-set point of time, the determiner 112 determines at least one application whose unused state repeats at least the threshold number of times until the pre-set point of time based on monitoring results.

Alternatively, when the uninstall condition is a used location or a connection frequency to another device, the determiner 112 may determine an uninstall level of each application based on monitoring results. In other words, the uninstall level of each application may be determined by monitoring different contexts, such as use frequencies, used locations, and people using (sharing) corresponding applications, according to types of applications.

The uninstaller 113 may change an icon of a determined application to a display state corresponding to an uninstall level of the determined application. Here, the UI 120 may display the icon having the display state on a UI screen.

At the same time, the uninstaller 113 performs an uninstall operation corresponding to the uninstall level of the determined application on the determined application.

First, uninstall operations performed on a determined application in uninstall levels will be described in detail.

FIG. 5 is a table for describing uninstall operations performed at each uninstall level, according to an exemplary embodiment. Referring to FIG. 5, uninstall operations performed at each of the first uninstall level, the second uninstall level, and the third uninstall level are described. For convenience of description, it is assumed that an application determined by the determiner 112 is the first application 21 of FIG. 1A in FIG. 5.

When the first application is determined to be at the first uninstall level, the uninstaller 113 performs a first uninstall operation corresponding to the first uninstall level on the first application.

In detail, the uninstaller 113 performs the first uninstall operation of ending functions of the device 10 required to drive the first application. Here, the ended functions include a function of exchanging information between the device 10 and a server (not shown) for providing a service of the first application through a network, a function of automatically updating the first application, and a background process of the first application.

In other words, the uninstaller 113 does not delete the first application itself, but performs the first uninstall operation by stopping a network traffic or network message generated by the first application, ending processes executed in a background of the device 10 for the first application, and ends an automatic update of the first application.

However, if the first application is used again by the user after the first uninstall operation is performed, the uninstaller 113 activates functions of the first application ended through the first uninstall operation.

When the first application is determined to be at the second uninstall level, the uninstaller 113 performs a second uninstall operation corresponding to the second uninstall level on the first application. In detail, the uninstaller 113 performs the second uninstall operation by deleting user data stored in the device 10 while using the first application, while maintaining only an icon of the first application displayed on the UI screen, and backing up the user data stored in the device 10 on a server.

Here, the user data includes basic setting information for driving the first application, login information of the first application, contents stored while using the first application, history information, and transaction information.

However, if the first application is used again by the user after the second uninstall operation is performed, the uninstaller 113 may restore (or roll back) the user data of the first application backed up in the server to the device 10.

When the first application is determined to be at the third uninstall level, the uninstaller 113 performs a third uninstall operation corresponding to the third uninstall level on the first application.

In detail, the uninstaller 113 performs the third uninstall operation by deleting the icon of the first application and entire information about the first application.

However, in the third uninstall operation, because the first application is completely deleted from the device 10, the device 10 may be pre-set such as to receive a user selection about whether to finally perform the third uninstall operation, i.e., whether to completely delete the first application, through the UI 120. In this case, the uninstaller 1130 may perform the third uninstall operation only when the user requests to perform the third uninstall operation through the UI 120.

It will be readily understood by one of ordinary skill in the art that other operations for accomplishing purposes of the first through third uninstall operations performed in the first through third uninstall levels described herein are within the scope of one or more exemplary embodiments, even if not described.

Referring back to FIG. 2, as described above, the uninstaller 113 changes the icon of the first application to a display state corresponding to an uninstall level of the first application (determined application), and the UI 120 displays the icon having the changed display state on the UI screen.

When an uninstall operation corresponding to an uninstall level is performed on the first application, the UI 120 may insert and display a predetermined symbol on a part of the icon of the first application. Here, the inserted symbol may have a padlock shape or an exclamation mark, but is not limited thereto.

Alternatively, when an uninstall operation corresponding to an uninstall level is performed on the first application, the UI 120 may adjust and display at least one of a color, brightness, chroma, and luma of the icon of the first application.

Alternatively, when an uninstall operation corresponding to an uninstall level is performed on the first application, the UI 120 may apply and display a predetermined visual effect to the icon of the first application.

Examples of the changed display state of the icon displayed through the UI 120 include a state wherein a symbol is inserted into a part of the icon, a state wherein the icon is dark, a state wherein the icon is foggy, a state wherein the icon is in a grayscale, a state wherein dotted lines are inserted to a boundary of the icon, a state wherein the icon is visually concave, a state wherein the icon is visually convex, and a state wherein the icon is shabby, but are not limited thereto.

A changed display state of an icon to which an uninstall operation is applied (in an uninstall level) is not limited as long as the icon is distinguished from icons of other applications to which an uninstall operation is not applied (not in an uninstall level).

This will be described in detail with reference to FIGS. 6A through 6F. In FIGS. 6A through 6F, UI screens viewed in front of the device 10 in a point of view of the user. Here, applications shown in FIGS. 6A through 6F may be results of changing displays of icons of the applications, or results of overlapping layers of others object on layers of the icons of the applications without changing the displays of the icons of the applications. Also, even when display states of the icons are changed as above, the user may perceive the same visual effects because the user only sees the front of the device 10.

Figure 6A:
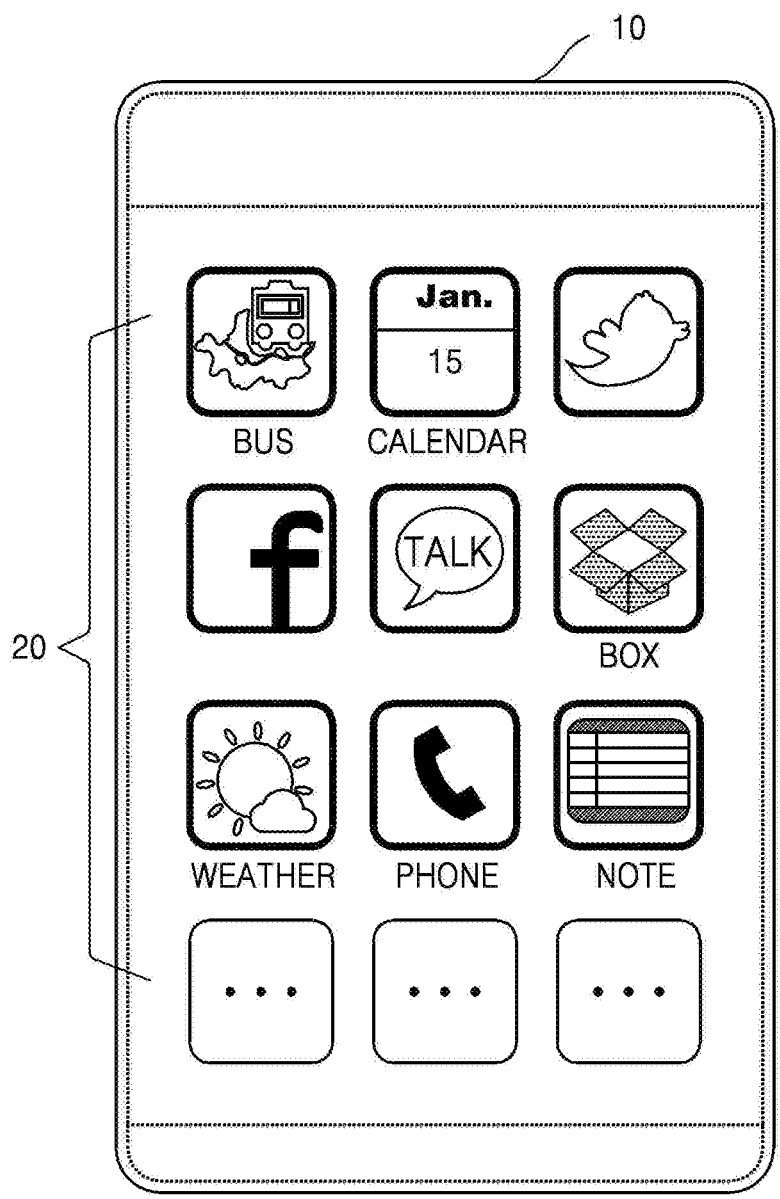
FIG. 6A illustrates a user interface (UI) screen displaying applications installed on a device, according to an exemplary embodiment.

FIG. 6A illustrates a UI screen displaying the applications 20 installed in the device 10, according to an exemplary embodiment. Referring to FIG. 6A, the applications 20, such as a bus application, a calendar application, a box application, a weather application, a phone application, and a note application, are installed in the device 10, and icons corresponding to objects representing the applications 20 may be displayed on the UI screen. The UI screen of FIG. 6A is only an example and is not limited thereto.

Meanwhile, the applications 20 may include applications that are basically installed along with the OS of the device 10, such as the calendar application, the phone application, and the note application. In other words, the basically installed applications are not directly installed by the user who is using the device 10, but may be installed via an initial booting of the device 10 so as to perform basic functions provided by the device 10, such as a phone call, a text, and a memo. Accordingly, such basically installed applications may not be managed according to one or more exemplary embodiments. In other words, the controller 110 including the monitor 111, the determiner 112, and the uninstaller 113 may be set to operate while excluding the basically installed applications. However, alternatively, operations and functions of the controller 110 may also be applied to the basically installed applications according to a setting of the user.

Figure 6B:
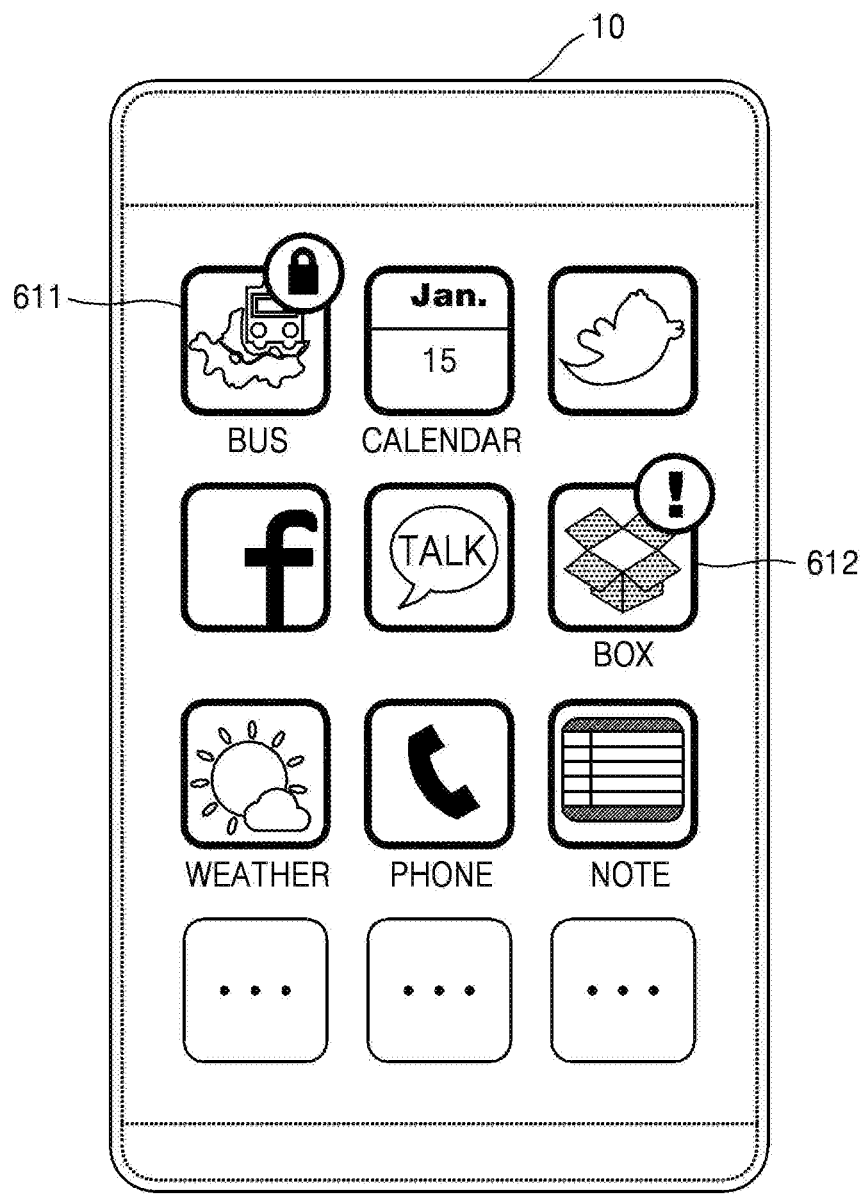
FIG. 6B illustrates a UI screen where an uninstall operation is applied to applications installed on a device, according to an exemplary embodiment.

FIG. 6B illustrates a UI screen where an uninstall operation is applied to the applications 20 installed on the device 10, according to an exemplary embodiment. Referring to FIG. 6B, a bus application 611 is at the first uninstall level and a box application 612 at in the second uninstall level.

As described above, the determiner 112 may determine that the bus application 611 is at the first uninstall level based on a monitored use history of the bus application 611. Also, the determiner 112 may determine that the box application 612 is at the second uninstall level based on a monitored use history of the box application 612.

The uninstaller 113 changes a display state of an icon of the bus application 611 at the first uninstall level such that a padlock symbol is inserted to the icon. Then, the UI 120 displays the icon of the bus application 611 into which the padlock symbol is inserted at a right top corner on the UI screen. Thus, the user may recognize that the bus application 611 is currently at the first uninstall level and the first uninstall operation is applied to the bus application 611.

Meanwhile, the changing of the display state (visual representation) of the icon of the bus application 611 may be performed by inserting the padlock symbol to the icon of the bus application 611. Alternatively, the changing of the display state of the icon of the bus application 611 may be performed by additionally overlapping a layer of the padlock symbol that is another object on a layer of the icon of the bus application 611. In other words, the current embodiment is not limited by any one of the above.

As described above, such methods are applied to change a display state (visual representation) of an application described here, and may be applied to change the display state such that an exclamation mark symbol is inserted to an icon (object) of the application, the icon is shown dark, the icon is shown blurry, a boundary of the icon is in dotted lines, or the icon is shown concave.

The uninstaller 113 may change the display state of the icon of the box application 612 at the second uninstall level such that an exclamation mark symbol is inserted to the icon of the box application 612. Then, the UI 120 displays the icon of the box application 612 into which the exclamation mark symbol is inserted in a top right corner on the UI screen. Accordingly, the user may recognize that the box application 612 is currently at the second uninstall level and the second uninstall operation is applied to the box application 612.

As such, the device 10 according to the current embodiment manages applications that are seldom used or not used by changing display states of the applications so that the user is able to easily manage the applications. In detail, the device 10 changes the display states of the applications according to uninstall levels so that the user is able to easily recognize a state of the applications and manage the applications.

Figure 6C:
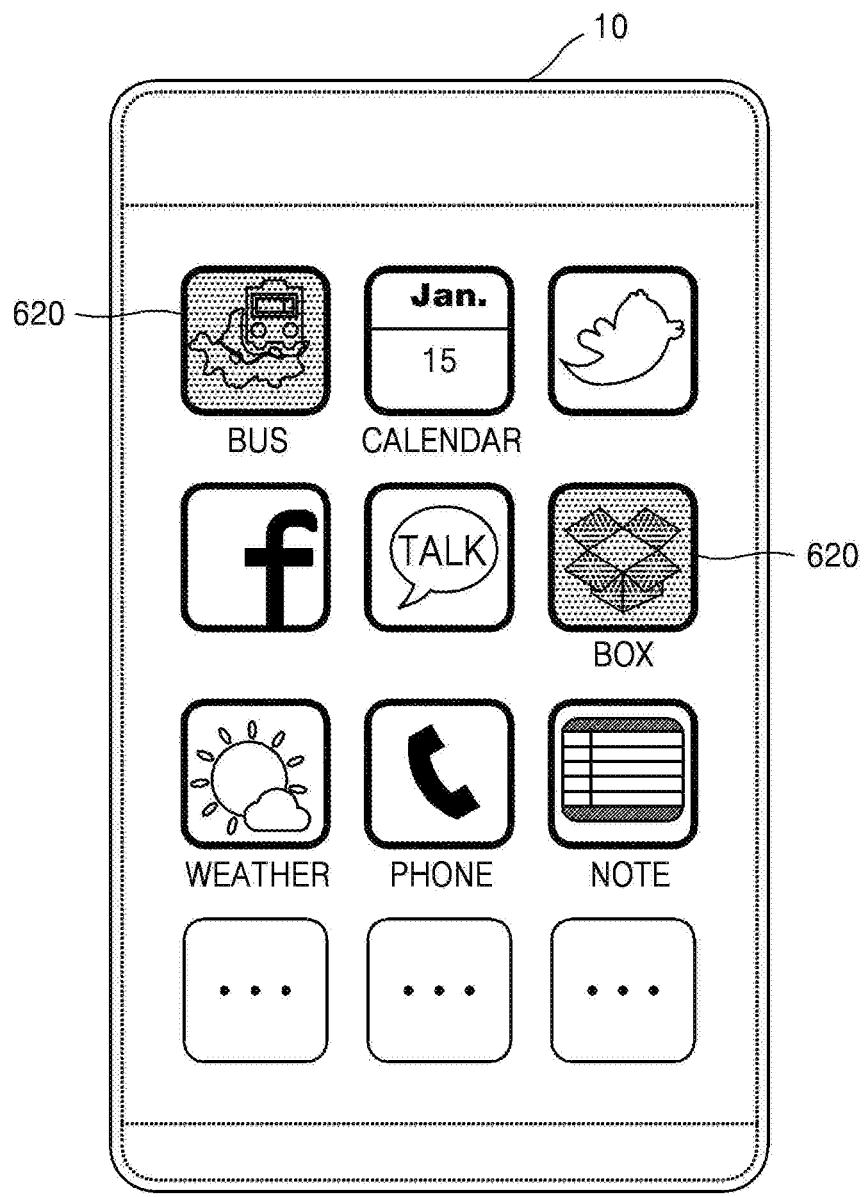
FIG. 6C illustrates a UI screen where an uninstall operation is applied to applications installed on a device, according to another exemplary embodiment.

FIG. 6C illustrates a UI screen where an uninstall operation is applied to the applications 20 installed in the device 10, according to another exemplary embodiment. Referring to FIG. 6C, bus and box applications 620 are at the first uninstall level.

As described above, the determiner 112 may determine that the bus and box applications 620 are in the first uninstall level based on monitored use histories of the bus and box applications 620.

The uninstaller 113 may change display states of icons of the bus and box applications 620 in the first uninstall level such that the icons are shown as being darker. Then, the UI 120 displays the icons of the bus and box applications 620, which are shown darker, on the UI screen. Accordingly, the user may recognize that the bus and box applications 620 are currently at the first uninstall level and the first uninstall operation is applied to the bus and box applications 620.

According to FIG. 6C, it is assumed that the bus and box applications 620 are at the same first uninstall level. However, if the bus and box applications 620 are at different uninstall levels, the UI 120 may display icons of the bus and box applications 620 at different degrees of darkness for classification.

Figure 6D:
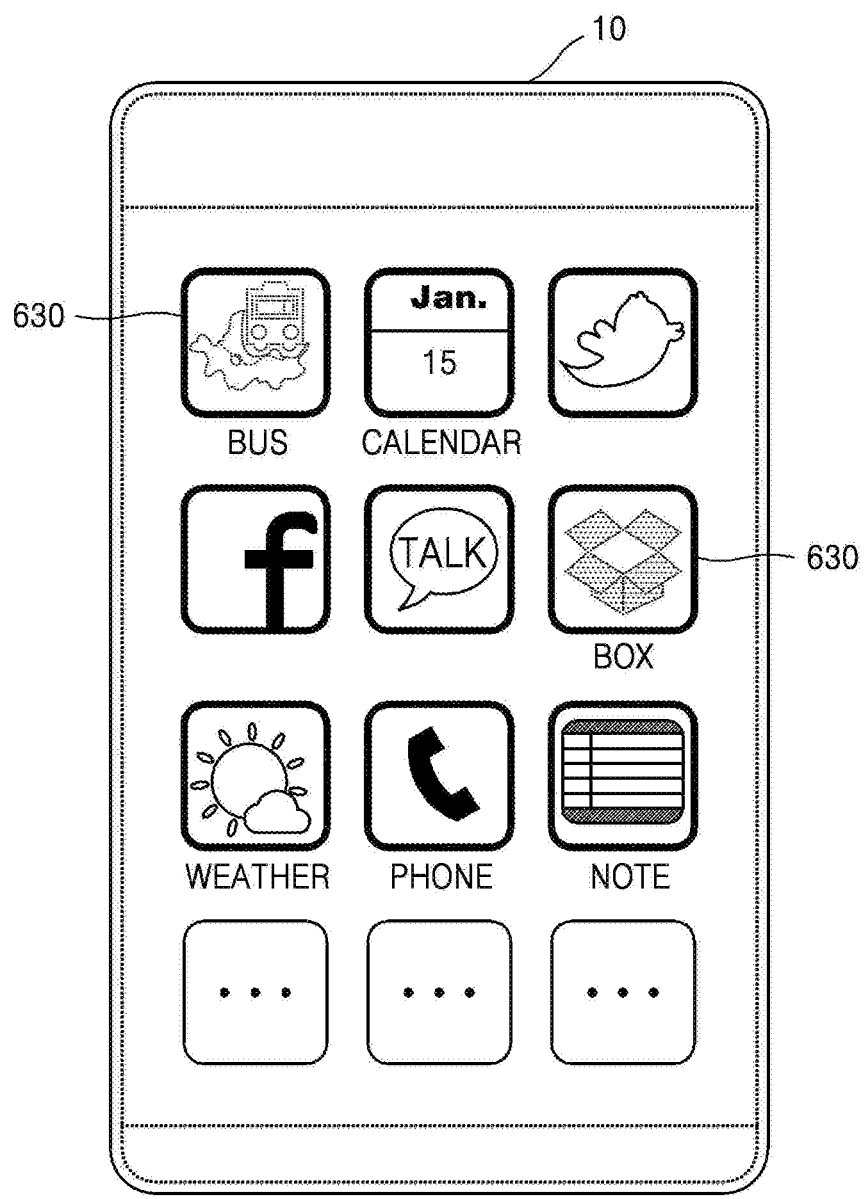
FIG. 6D illustrates a UI screen where an uninstall operation is applied to applications installed on a device, according to another exemplary embodiment.

FIG. 6D illustrates a UI screen where an uninstall operation is applied to the applications 20 installed in the device 10, according to another exemplary embodiment. In FIG. 6D, bus and box applications 630 are at the first uninstall level.

As described above, the determiner 112 may determine that the bus and box applications 630 are at the first uninstall level based on monitored use histories of the bus and box applications 630.

The uninstaller 113 may change display states of icons of the bus and box applications 630 in the first uninstall level such that the icons are shown blurry. Then, the UI 120 displays the icons of the bus and box applications 630, which are shown blurry, on the UI screen. Accordingly, the user may recognize that the bus and box applications 630 are currently at the first uninstall level and the first uninstall operation is applied to the bus and box applications 630.

According to FIG. 6D, it is assumed that the bus and box applications 630 are at the same first uninstall level. However, if the bus and box applications 630 are at different uninstall levels, the UI 120 may display icons of the bus and box applications 630 in different degrees of blurriness for classification.

Figure 6E:
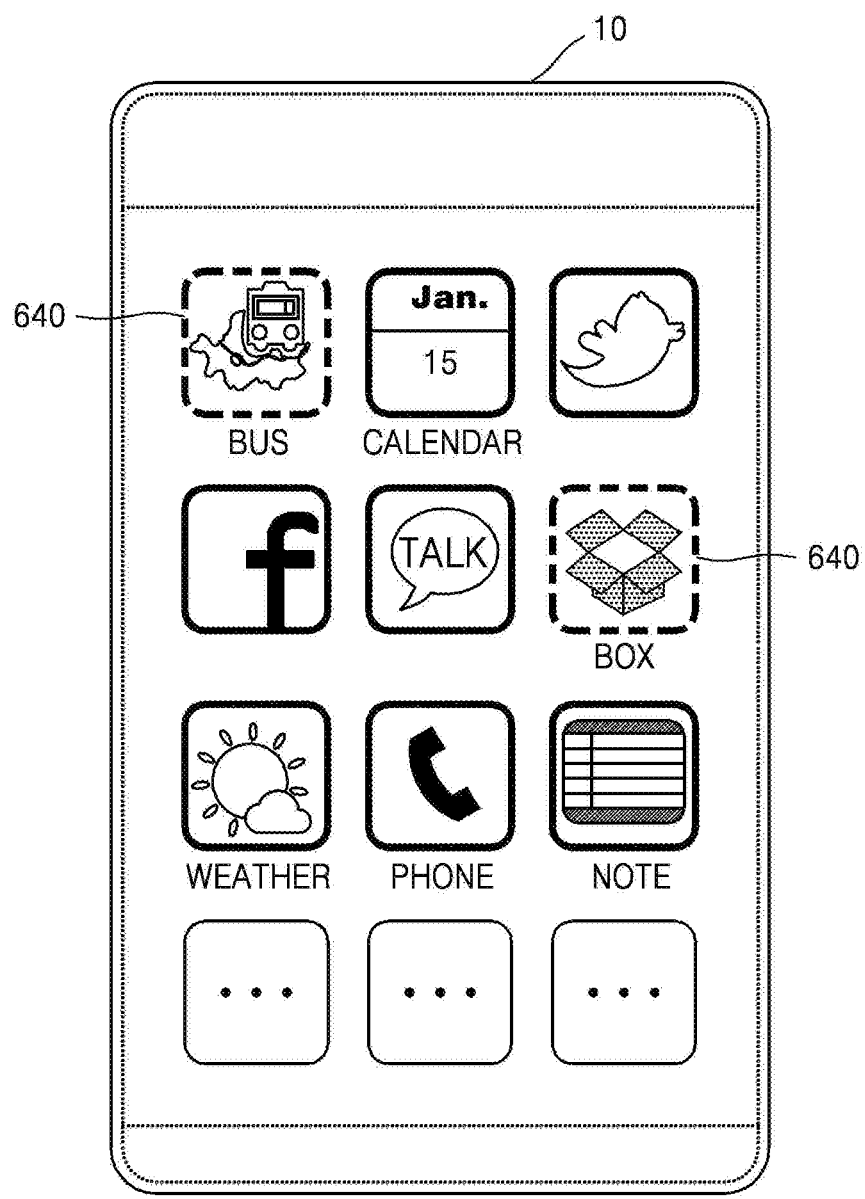
FIG. 6E illustrates a UI screen where an uninstall operation is applied to applications installed on a device, according to another exemplary embodiment.

FIG. 6E illustrates a UI screen where an uninstall operation is applied to the applications 20 installed in the device 10, according to another exemplary embodiment. Referring to FIG. 6E, it is assumed that bus and box applications 640 are at the first uninstall level.

As described above, the determiner 112 may determine that the bus and box applications 640 are at the first uninstall level based on monitored use histories of the bus and box applications 640.

The uninstaller 113 may change display states of icons of the bus and box applications 640 at the first uninstall level such that boundaries of the icons are in dotted lines. Then, the UI 120 displays the icons of the bus and box applications 640 whose boundaries are in dotted lines on the UI screen. Accordingly, the user may recognize that the bus and box applications 640 are currently at the first uninstall level and the first uninstall operation is applied to the bus and box applications 640.

Figure 6F:
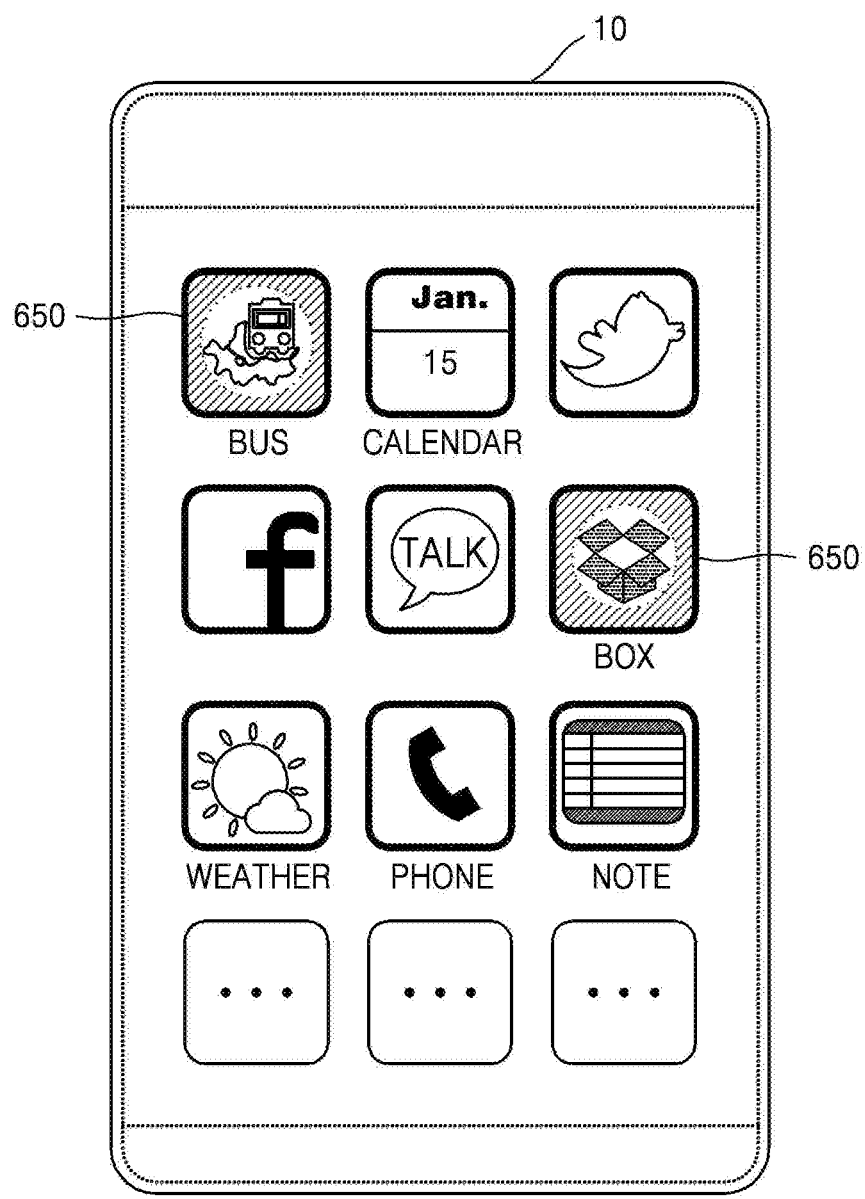
FIG. 6F illustrates a UI screen where an uninstall operation is applied to applications installed on a device, according to another exemplary embodiment.

FIG. 6F illustrates a UI screen in which an uninstall operation is applied to the applications 20 installed in the device 10, according to another exemplary embodiment. Referring to FIG. 6F, it is assumed that bus and box applications 650 are at the first uninstall level.

As described above, the determiner 112 may determine that the bus and box applications 650 are at the first uninstall level based on monitored use histories of the bus and box applications 650.

The uninstaller 113 may change display states of icons of the bus and box applications 650 in the first uninstall level such that the icons are shown concave. Then, the UI 120 displays the icons of the bus and box applications 650 shown concave on the UI screen. Accordingly, the user may recognize that the bus and box applications 650 are currently at the first uninstall level and the first uninstall operation is applied to the bus and box applications 650.

It will be readily understood by one of ordinary skill in the art that the UI screens shown in FIGS. 6A through 6F are only examples for describing display states of icons of applications, and thus are not limited thereto.

Figure 7A:
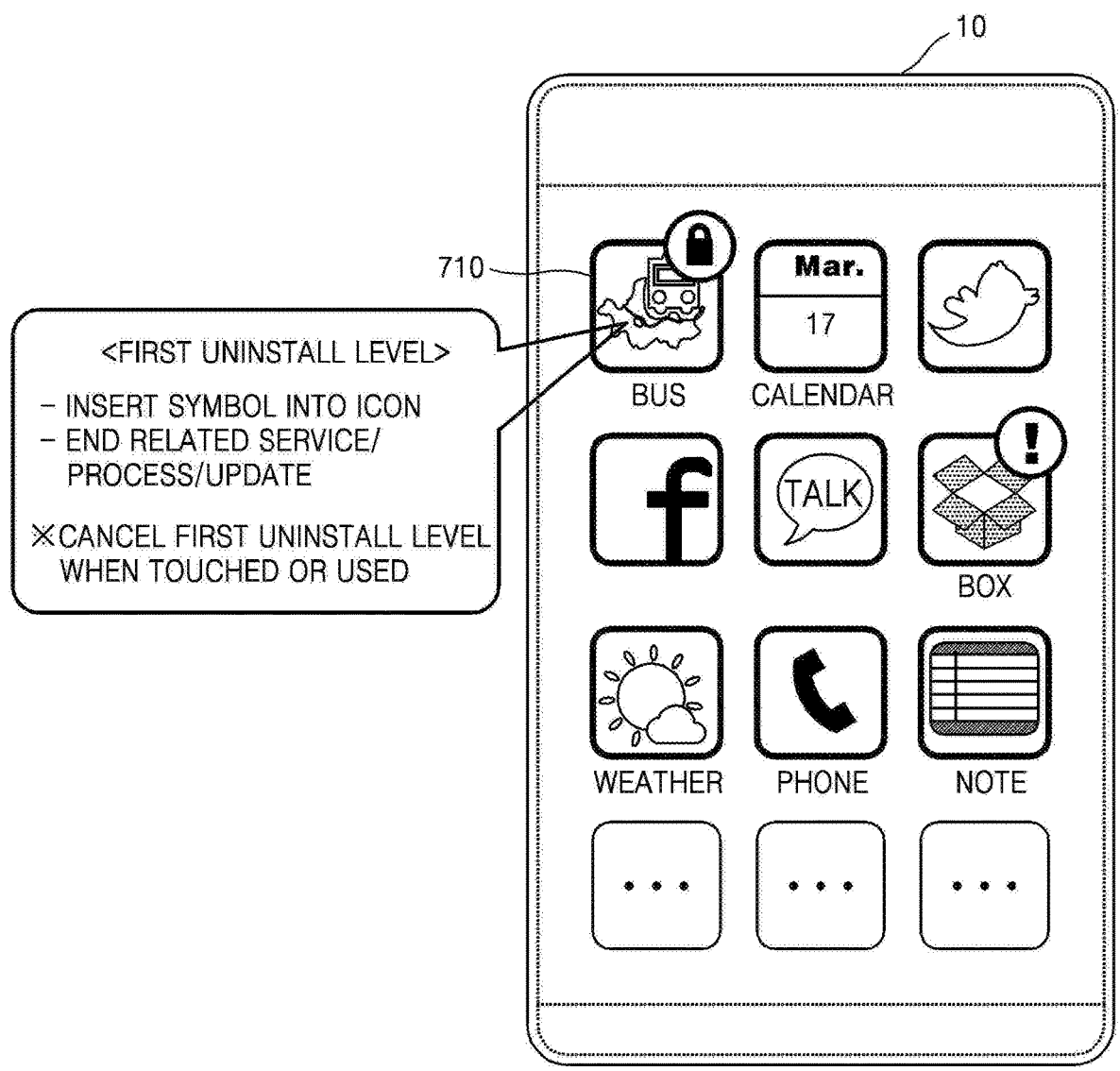
FIG. 7A is a diagram for describing a first uninstall operation preformed at a first uninstall level, according to an exemplary embodiment.

FIG. 7A is a diagram for describing the first uninstall operation preformed at the first uninstall level, according to an exemplary embodiment. Referring to FIG. 7A, it is assumed that a bus application 710 is at the first uninstall level.

As described above, the determiner 112 may determine that the bus application 710 is at the first uninstall level based on monitored use history of the bus application 710.

The uninstaller 113 may change a display state of an icon of the bus application 710 at the first uninstall level such that a padlock symbol is added onto the icon of the bus application 710. Then, the UI 120 displays the icon of the bus application 710 onto which the padlock symbol is inserted in a top right corner on the UI screen.

Moreover, the uninstaller 113 performs the first uninstall operation of ending functions of the device 10 required to drive the bus application 710. The ended functions includes a function of exchanging information between the device 10 and a server for providing a service of the bus application 710 through a network, a function of automatically updating the bus application 710, and a background process of the bus application 710.

The uninstaller 113 may not delete the bus application 710 but performs the first uninstall operation by stopping a network traffic or network message generated by the bus application 710, ending processes executed in the background of the device 10 for the bus application 710, and ends an automatic update of the bus application 710.

However, if the bus application 710 is used again by the user after the first uninstall operation is performed, the uninstaller 113 may again activate the functions of the bus application 710 ended through the first uninstall operation.

Figure 7B:
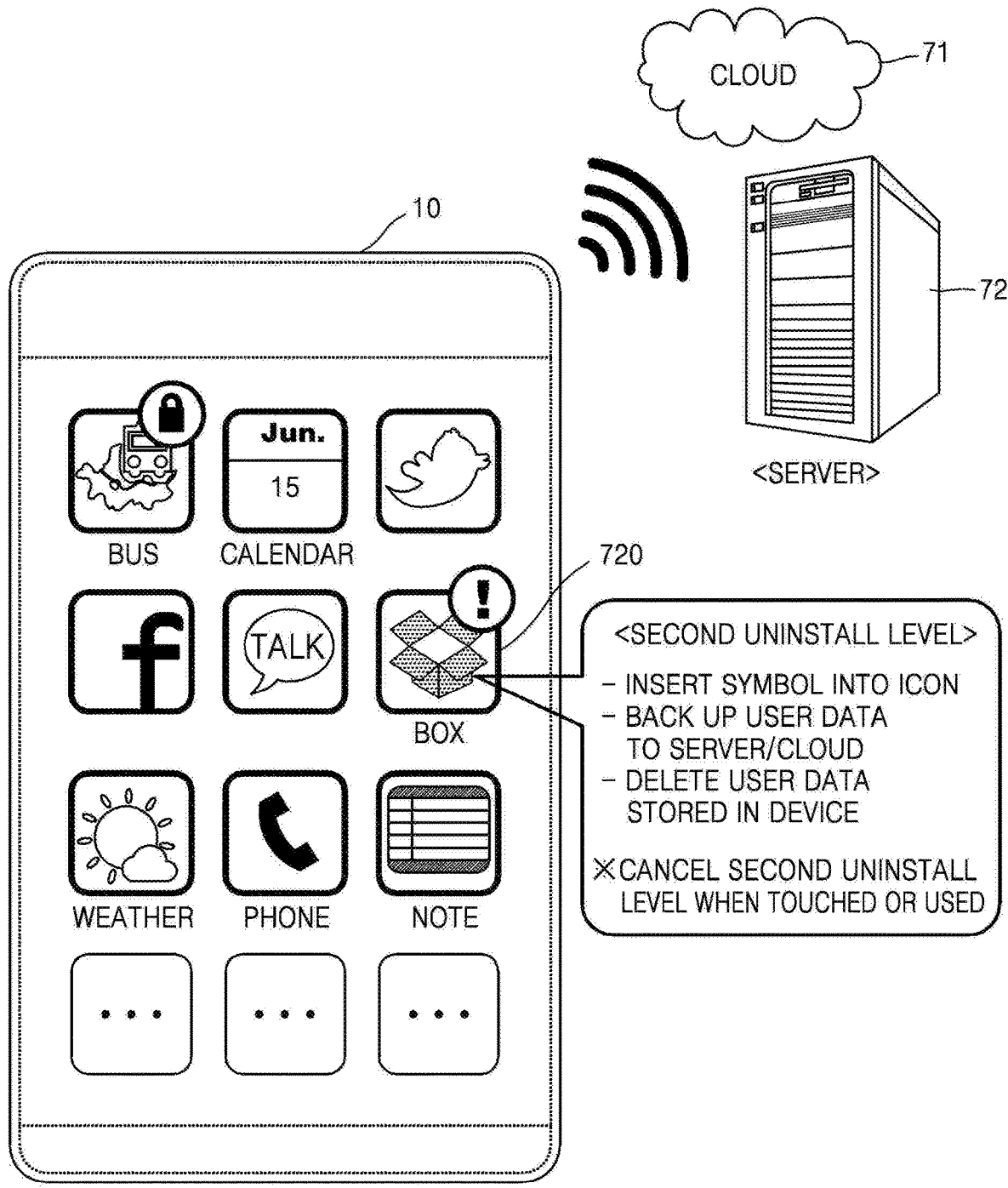
FIG. 7B is a diagram for describing a second uninstall operation preformed at a second uninstall level, according to an exemplary embodiment.

FIG. 7B is a diagram for describing the second uninstall operation preformed at the second uninstall level, according to an exemplary embodiment. Referring to FIG. 7B, it is assumed that a box application 720 is at the second uninstall level.

As described above, the determiner 112 may determine that the box application 720 is at the second uninstall level based on monitored use history of the box application 720.

The uninstaller 113 may change a display state of an icon of the box application 720 at the second uninstall level such that an exclamation mark symbol is inserted in the icon of the box application 720. Then, the UI 120 displays the icon of the box application 720 into which the exclamation mark symbol is inserted in a top right corner on the UI screen.

Moreover, the uninstaller 113 performs the second uninstall operation by maintaining only the icon of the box application 720 for displaying the box application 720 on the UI screen while deleting user data stored in the device 10 while using the box application 720 and backing up the user data stored in the device 10 in a cloud 71 or a server 72.

The user data may include basic setting information for driving the box application 720, login information of the box application 720, a content stored while using the box application 720, history information, and transaction information.

However, if the box application 720 is used again by the user after the second uninstall operation is performed, the uninstaller 113 may again restore (or roll back) the user data of the box application 720 backed up in the cloud 71 or the server 72 to the device 10.

Figure 7C:
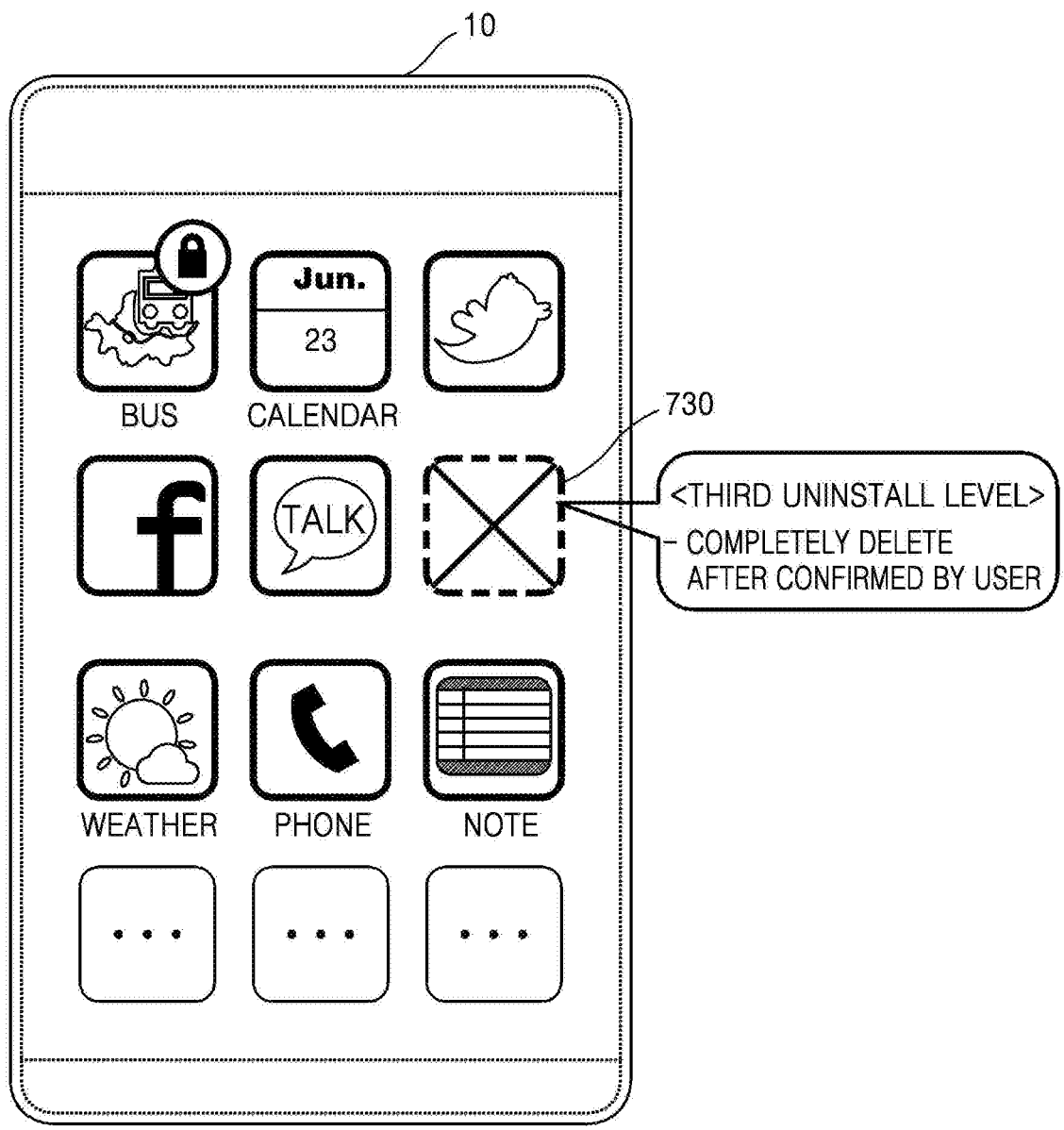
FIG. 7C is a diagram for describing a third uninstall operation preformed at a third uninstall level, according to an exemplary embodiment.

FIG. 7C is a diagram for describing the third uninstall operation preformed at the third uninstall level, according to an exemplary embodiment. Referring to FIG. 7C, it is assumed that a box application 730 is at the third uninstall level.

As described above, the determiner 112 may determine that the box application 730 is at the third uninstall level based on monitored use history of the box application 730.

The uninstaller 113 performs the third uninstall operation by deleting an icon of the box application 730 and entire information about the box application 730. In other words, the box application 730 may be completely deleted not only from the UI screen but also from the device 10 and the cloud 71 or server 72 of FIG. 7B.

However, in the third uninstall operation, because the box application 730 is completely deleted from the device 10, the device 10 may be pre-set such as to receive a user selection about whether to finally perform the third uninstall operation, i.e., whether to completely delete the box application 730, through the UI 120. In this case, the uninstaller 1130 may perform the third uninstall operation only when the user requests to perform the third uninstall operation through the UI 120.

Figure 8:
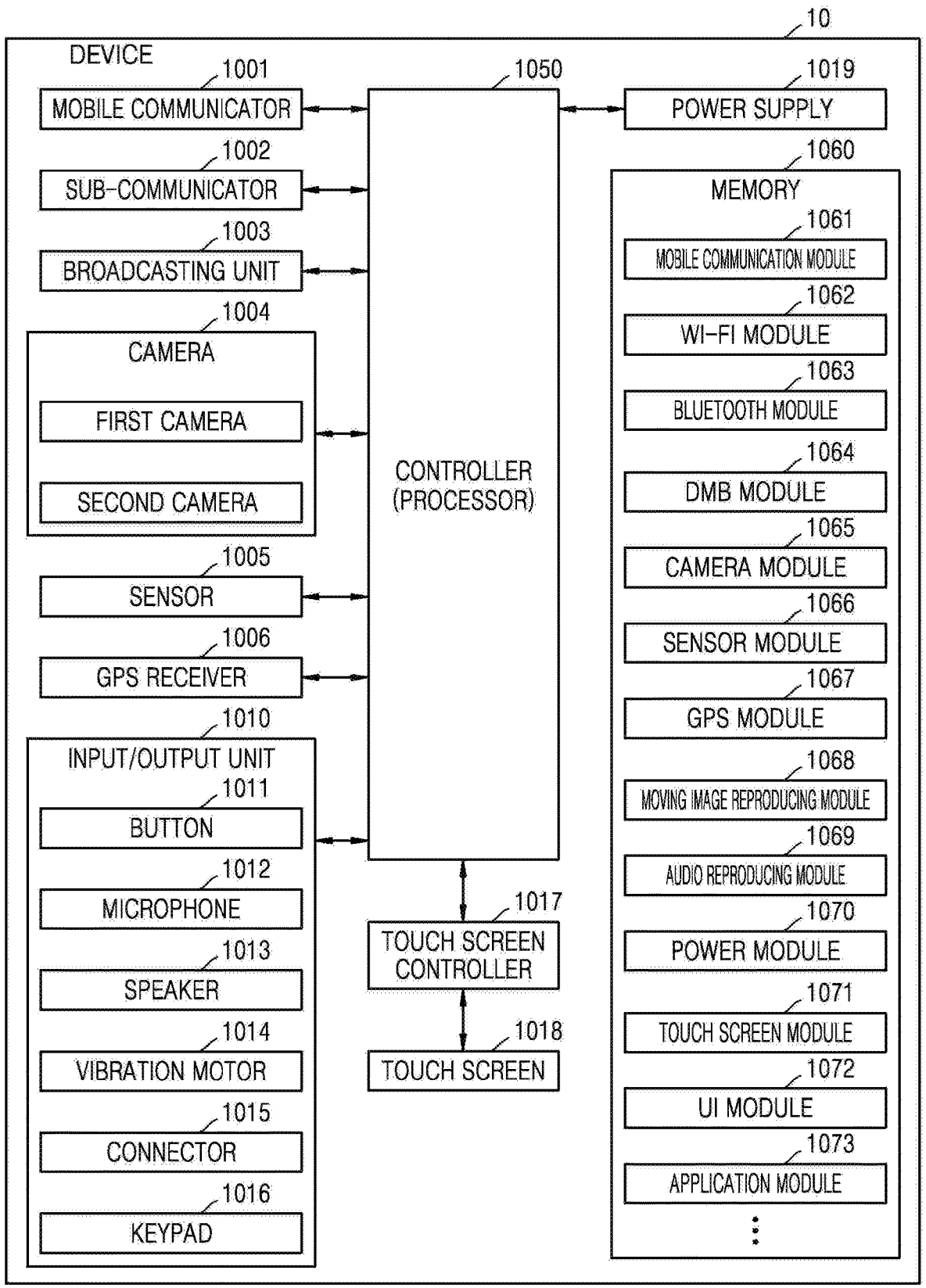
FIG. 8 is a detailed block diagram of a device for managing applications, according to an exemplary embodiment.

FIG. 8 is a detailed block diagram of the device 10 for managing applications, according to an exemplary embodiment. Components included in the device 10 of FIG. 2 described above may also be included in the device 10 of FIG. 8.

A mobile communicator 1001 may perform call setting, data communication, or the like with a base station through a cellular network, such as 3rd generation (3G) or 4th generation (4G). A sub-communicator 1002 performs a function for short distance communication, such as Bluetooth or near field communication (NFC). A broadcasting unit 1003 receives a digital multimedia broadcasting (DMB) signal.

A camera 1004 may include lens and optical devices for capturing an image or moving image.

A sensor unit 1005 may include a gravity sensor for detecting movement of the device 10, an illumination sensor for detecting light brightness, a proximity sensor for detecting a proximity degree of a person, and a motion sensor for detecting movement of a person.

A global positioning system (GPS) receiver 1006 may receive a GPS signal from a satellite. Various services may be provided to the user by using the GPS signal.

An input/output unit 1010 may provide an interface with an external device or a person, and includes a button 1011, a microphone 1012, a speaker 1013, a vibration motor 1014, a connector 1015, and a keypad 1016.

A touch screen 1018 may receive a touch input of the user. Also, a touch screen controller 1017 transmits the touch input received through the touch screen 1018 to a controller 1050. A power supply 1019 is connected to a battery or external power source to supply power required for the device 10.

The input/output unit 1010 and the touch screen 1018 may correspond to detailed components of the UI 120 of FIG. 2.

The controller 1050 may execute programs stored in a memory 1060 to execute an object on a display and display a result of executing, according to an exemplary embodiment.

The controller 1050 may correspond to the controller 110 of FIG. 2 including the monitor 111, the determiner 112, and the uninstaller 113.

The memory 1060 may store results processed or performed by the device 10. For example, the memory 1060 may store monitoring results of the monitor 111, determining results of the determiner 112, and uninstalling results of the uninstaller 113.

Programs stored in the memory 1060 may be classified into a plurality of modules according to functions, for example, into a mobile communication module 1061, a Wi-Fi module 1062, a Bluetooth module 1063, a DMB module 1064, a camera module 1065, a sensor module 1066, a GPS module 1067, a moving image reproducing module 1068, an audio reproducing module 1069, a power module 1070, a touch screen module 1071, a UI module 1072, and an application module 1073.

For example, the mobile communication module 1061, the Wi-Fi module 1062, and the Bluetooth module 1063 may receive information about an object from another device or a server by using at least one of the mobile communicator 1001, the sub-communicator 1002, and the broadcasting unit 1003.

Also, for example, the touch screen module 1071 may receive a touch input of the user through a screen of the device 10.

Also, for example, the application module 1073 may determine a type of the touch input of the user and determine whether to expand an object according to the touch input. Also, for example, the application module 1073 may determine whether a size of the expanded object is equal to or above a threshold value, and determine which information to be displayed on the expanded object. Also, for example, the application module 1073 may determine how to process a display screen according to the expansion of the object.

Also, for example, the UI module 1072 may expand and display an object on the display screen, and display predetermined information on the expanded object based on the determination of the application module 1073. Also, for example, the UI module 1072 may fix and display the expanded object, or reduce the expanded object based on the determination of the application module 1073.

Functions of each module may be intuitively inferred by one of ordinary skill in the art based on its name, and each module may correspond to a group of commands for performing at least one function described herein.

Commands do not have to be executed in separate software programs, procedures, or modules. The memory 1060 may include more or less commands. Moreover, various functions of the device 10 may be executed by hardware and/or software including at least one signal processing and/or application specified integrated circuit (IC).

Figure 9:
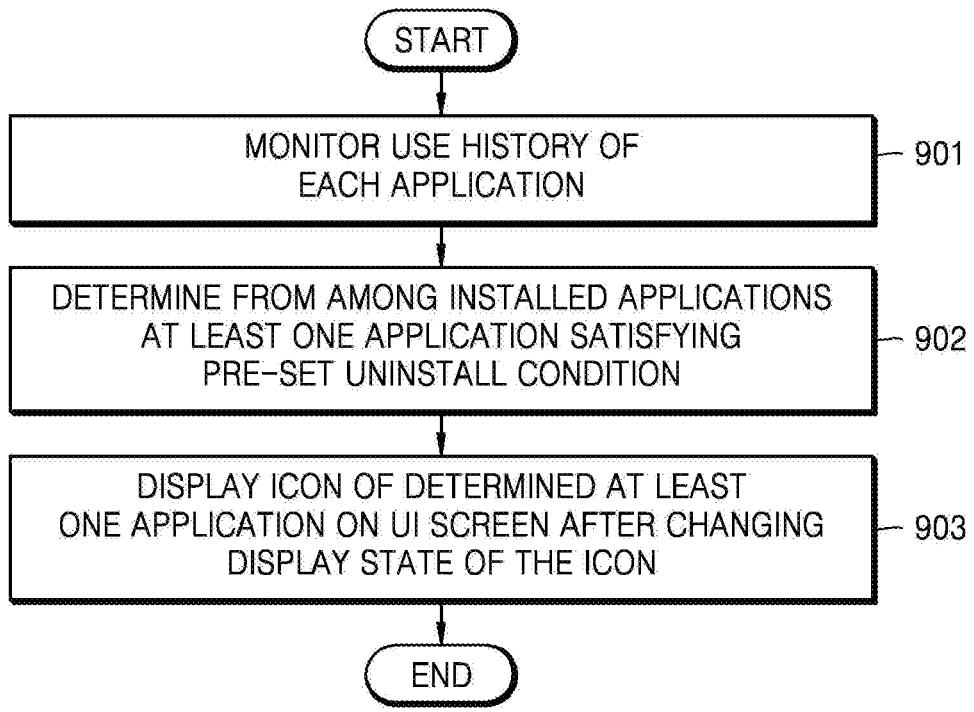
FIG. 9 is a flowchart illustrating a method of managing applications installed on a device, according to an exemplary embodiment.

FIG. 9 is a flowchart illustrating a method of managing applications installed on the device 10, according to an exemplary embodiment. Referring to FIG. 9, the method may include operations processed by the device 10 of FIG. 2 or 8 in time series, and thus, details described above with reference to FIGS. 1A through 8 may also apply to the method of FIG. 9 even if omitted.

In operation 901, the controller 110 controls the monitor 111 to monitor use histories of applications installed in the device 10.

In operation 902, the controller 110 controls the determiner 112 to determine at least one application satisfying a pre-set uninstall condition from among the installed applications based on the monitored use histories.

In operation 903, the UI 120 displays an icon of the determined at least one application on the UI screen after changing a display state of the icon.

Figure 10:
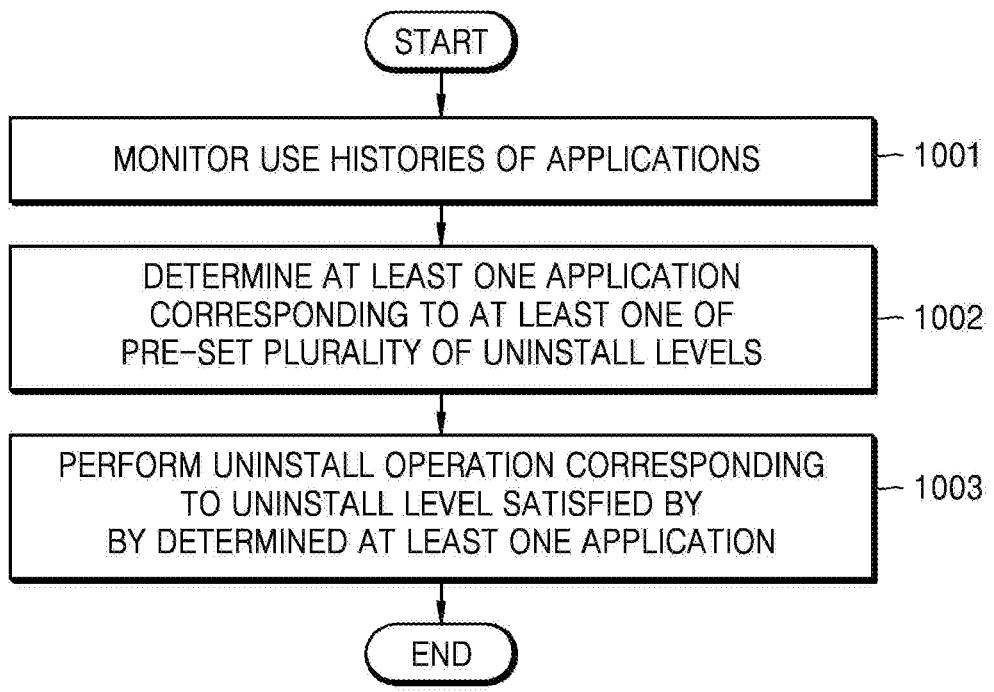
FIG. 10 is a flowchart illustrating a method of managing applications installed on a device, according to another exemplary embodiment.

FIG. 10 is a flowchart illustrating a method of managing applications installed on the device 10, according to another exemplary embodiment. Referring to FIG. 10, the method includes operations processed by the device 10 of FIG. 2 or 8 in time series, and thus, details described above with reference to FIGS. 1A through 8 may also be applied to the method of FIG. 10 even if omitted.

In operation 1001, the controller 110 controls the monitor 111 to monitor use histories of the applications installed in the device 10.

In operation 1002, the controller 110 controls the determiner 112 to determine at least one application corresponding to at least one of a pre-set plurality of uninstall levels, based on the monitored use histories.

In operation 1003, the controller controls the uninstaller 113 to perform an uninstall operation corresponding to an uninstall level satisfied by the determined at least one application on the determined at least one application.

Figure 11:
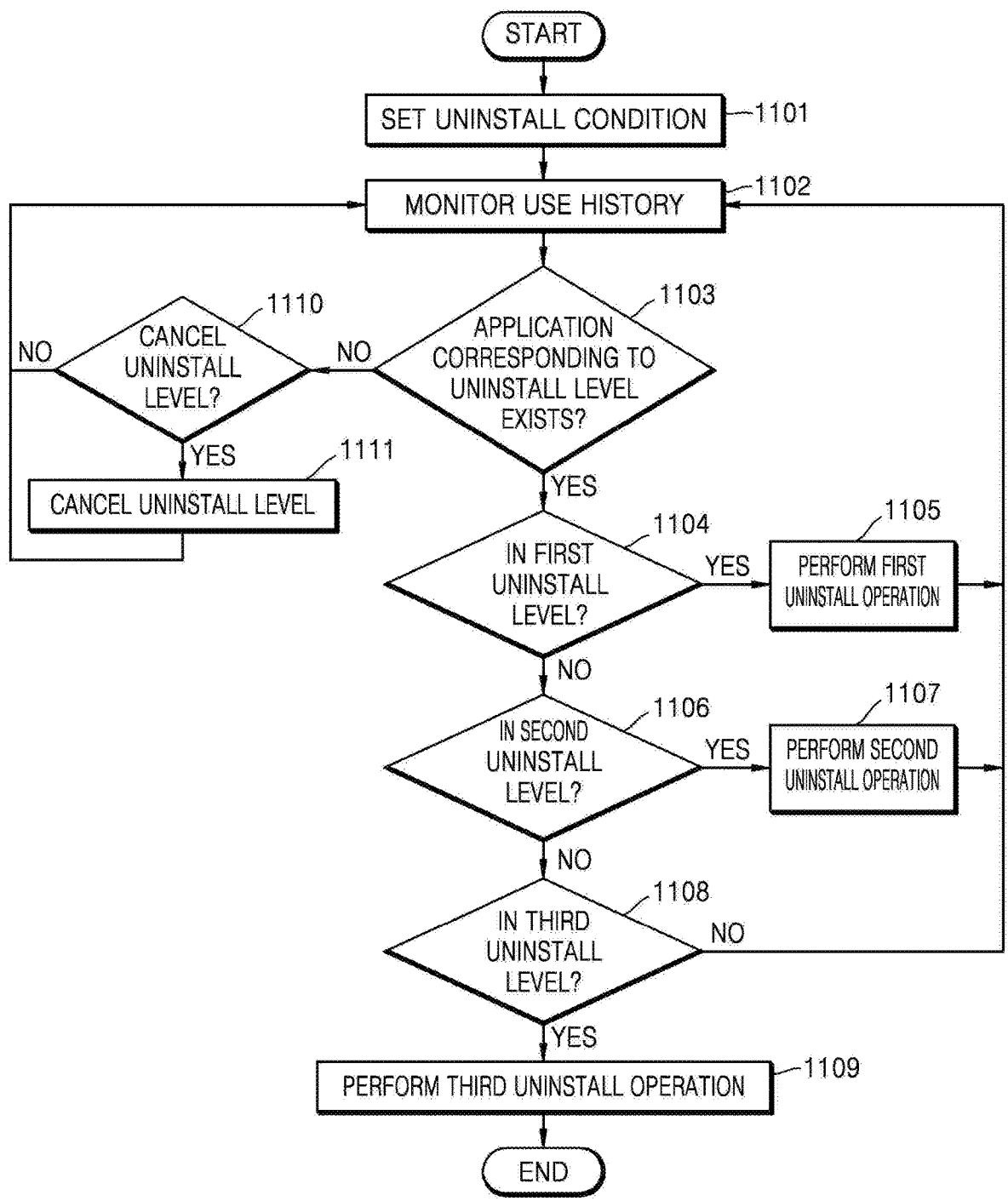
FIG. 11 is a flowchart illustrating a method of managing applications installed on a device, according to another exemplary embodiment.

FIG. 11 is a flowchart illustrating a method of managing applications installed on the device 10, according to another exemplary embodiment. FIG. 11 is a detailed flowchart of the methods of FIGS. 9 and 10. Referring to FIG. 11, the method includes operations processed by the device 10 of FIG. 2 or 8 in time series, and thus, details described above with reference to FIGS. 1A through 8 may also apply to the method of FIG. 11 even if omitted.

In operation 1101, the device 10 sets an uninstall condition for each uninstall level, according to a user input through the UI 120. Also, if the uninstall condition is not set by the user, the device 10 may arbitrarily set the uninstall condition to a default value assigned by the OS of the device 10.

In operation 1102, the controller 110 controls the monitor 111 to monitor use histories of the applications installed in the device 10.

In operation 1103, the controller 110 controls the determiner 112 to determine whether at least one application satisfying the pre-set uninstall condition exists from among the installed applications based on the monitored use histories.

If the at least one application exists, the controller 110 performs operation 1104. However, if the at least one application does not exist, the controller 110 performs operation 1102 to continuously monitor the use histories.

In operation 1104, the controller 110 controls the determiner 112 to determine whether the at least one application is in the first uninstall level based on the monitored use histories.

If the at least one application is at the first uninstall level, the controller 110 performs operation 1105. However, if the at least one application is not at the first uninstall level, the controller 110 performs operation 1106.

In operation 1105, the controller controls the uninstaller 113 to perform the first uninstall operation on the at least one application.

After the first uninstall operation is performed, the controller 110 performs operation 1102 to again continuously monitor the use histories.

In operation 1106, the controller 110 controls the determiner 112 to determine whether the at least one application is in the second uninstall level based on the monitored use histories.

If the at least one application is at the second uninstall level, the controller 110 performs operation 1107. However, if the at least one application is not at the second uninstall level, the controller 110 performs operation 1108.

In operation 1107, the controller 110 controls the uninstaller 113 to perform the second uninstall operation on the at least one application.

After the second uninstall operation is performed, the controller 110 performs operation 1102 to again continuously monitor the use histories.

In operation 1108, the controller 110 controls the determiner 112 to determine whether the at least one application is at the third uninstall level based on the monitored use history.

If the at least one application is at the third uninstall level, the controller 110 performs operation 1109. However, if the at least one application is not at the third uninstall level, the controller 110 performs operation 1102.

In operation 1109, the controller, 110 controls the uninstaller 113 to perform the third uninstall operation on the at least one application.

Meanwhile, in the current exemplary embodiment, it may be assumed that three uninstall levels exist. Thus, after the third uninstall operation is performed, the at least one application is completely deleted from the device 10, and thus, no more uninstall operation is performed. However, as described above, the three uninstall levels are assumed for convenience of description in the current embodiment, and thus, there may be more or less number of uninstall levels by subdividing or combining the first through third uninstall levels described herein.

In operation 1110, if it is determined that there is no application corresponding to an uninstall level in operation 1103, the controller 110 determines whether there is an application whose uninstall level needs to be canceled. In other words, when an uninstall level was applied to an application because a user did not use the application but the user is currently using the application, the uninstall level of the application may need to be released. Accordingly, the controller 110 determines whether to release the uninstall level of the application to which the uninstall level was applied.

If the uninstall level is to be released, the controller 110 performs operation 1111. However, if the uninstall level is not to be released, the controller 110 performs operation 1102.

In operation 1111, the controller 110 cancels the uninstall level of the application determined in operation 1110. Then, the controller 110 performs operation 1102 again.

Figure 12:
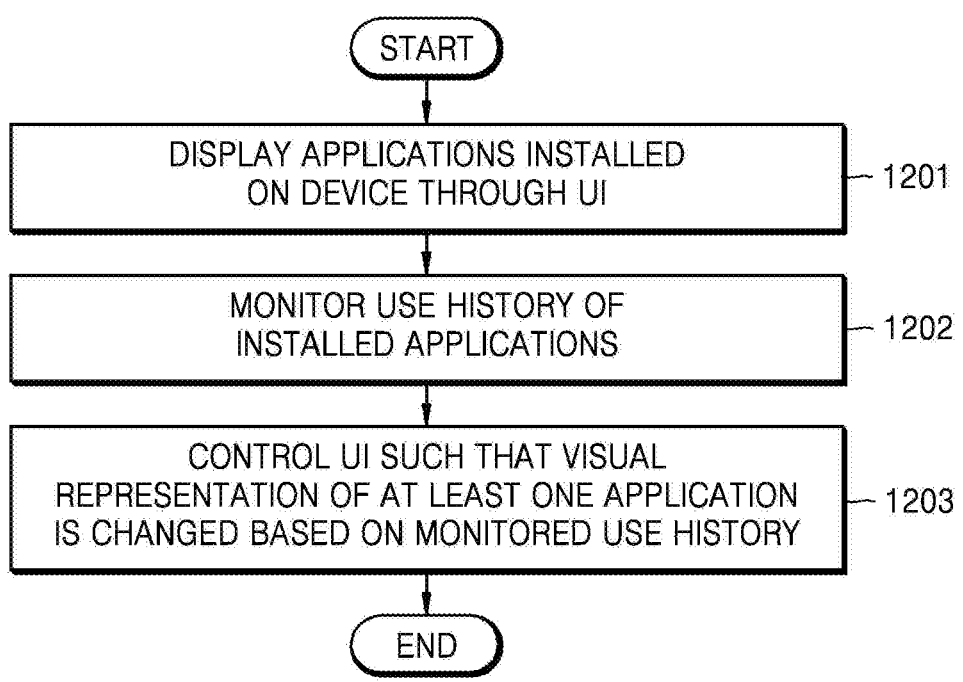
FIG. 12 is a flowchart illustrating a method of managing applications installed on a device, according to another exemplary embodiment.

FIG. 12 is a flowchart illustrating a method of managing applications installed on the device 10, according to another exemplary embodiment. Referring to FIG. 12, the method includes operations performed by the device 10 of FIG. 2 or 8 in time series, and thus, details described above with reference to FIGS. 1A through 8 may also apply to the method of FIG. 12.

In operation 1201, the UI 120 displays the applications installed on the device 10.

In operation 1202, the controller 110 controls the monitor 111 to monitor use histories of the installed applications.

In operation 1203, the controller 110 controls the uninstaller 113 to control the UI 120 such that visual representation of at least one application is changed based on the monitored use histories.

Figure 13:
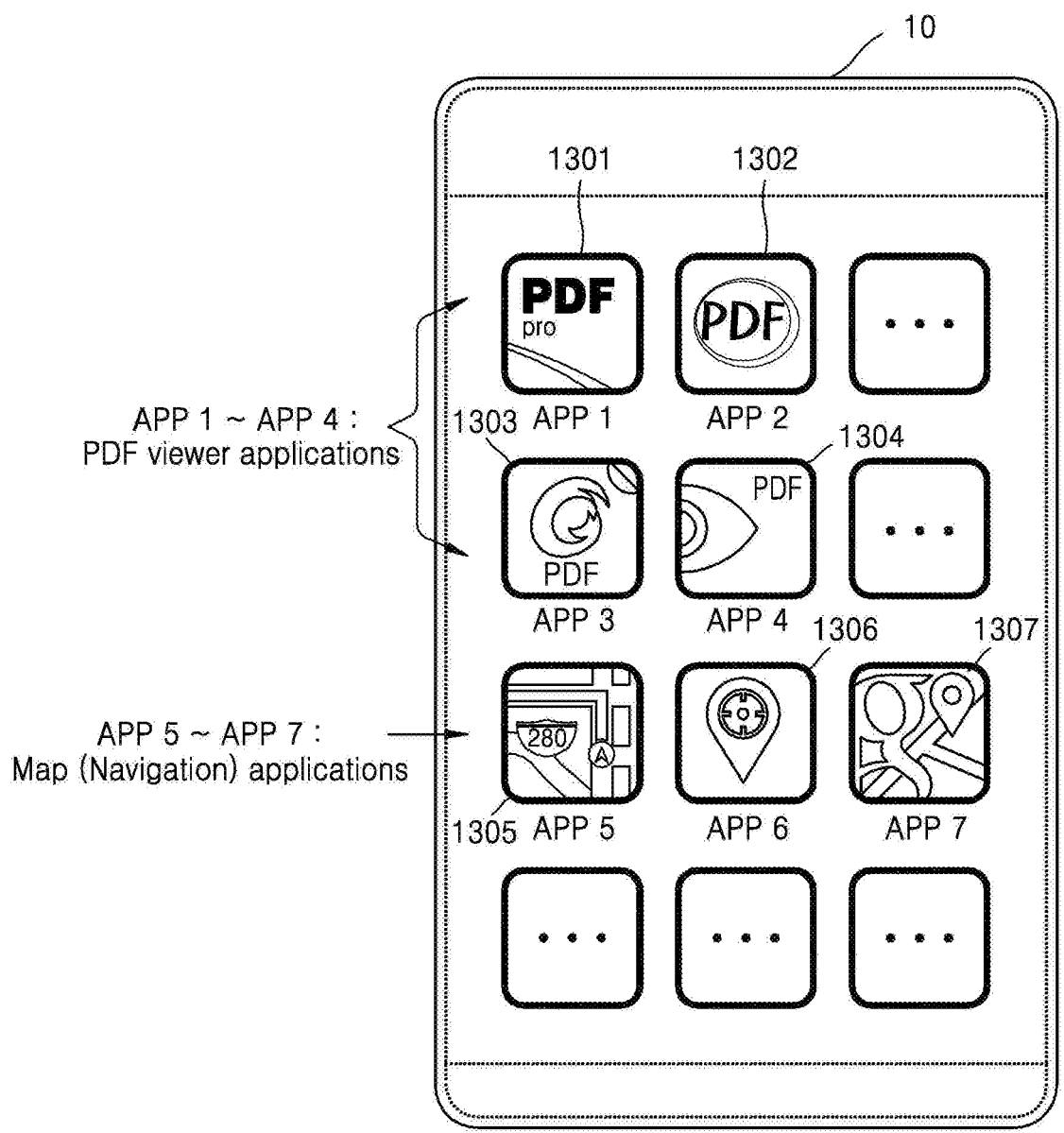
FIG. 13 illustrates a UI screen displaying applications of same types that are installed on a device, according to an exemplary embodiment.

FIG. 13 illustrates a UI screen displaying applications of same types that are installed on the device 10, according to an exemplary embodiment. Referring to FIG. 13, first through seventh applications 1301 through 1307 are installed on the device 10, and icons corresponding to objects representing the first through seventh applications 1301 through 1307 are displayed on the UI screen. However, the UI screen of FIG. 13 is only an example, and is not limited thereto.

The first through fourth applications 1301 through 1304 are portable document format (PDF) edit applications or PDF viewer applications. The first through fourth applications 1301 through 1304 may be applications developed by one application manufacturer or different application manufacturers, and may be classified as applications of the same type because they provide a PDF document edit tool or a PDF document viewer tool.

Also, the fifth through seventh applications 1305 through 1307 are map applications or navigation applications. Similarly, the fifth through seventh applications 1305 through 1307 may be applications developed by one application manufacturer or different application manufacturers, and may be classified as applications of the same type because they provide map information or navigation information.

In the current exemplary embodiment, applications of the same type may be defined based on various standards. For example, applications that process documents of the same extension (*.pdf), such as the first through fourth applications 1301 through 1304, may be classified as applications of the same type, or applications that perform the same function (a map function or a navigation function), such as the fifth through seventh applications 1305 through 1307, may be classified as applications of the same type.

The user may additionally install various applications while using the device 10. For example, the user may forget that the first application 1301 that is a PDF viewer application is pre-installed and additionally install the fourth application 1304 that is also a PDF viewer application. In other words, the user may install many duplicate applications. Here, the duplicate applications may be applications of the same type. When the number of duplicate applications that are not used often increases, a storage space of the device 10 is decreased and a process speed of the device 10 is decreased. However, it may be inconvenient for the user to search for and remove the duplicate applications installed on the device 10.

Figure 14:
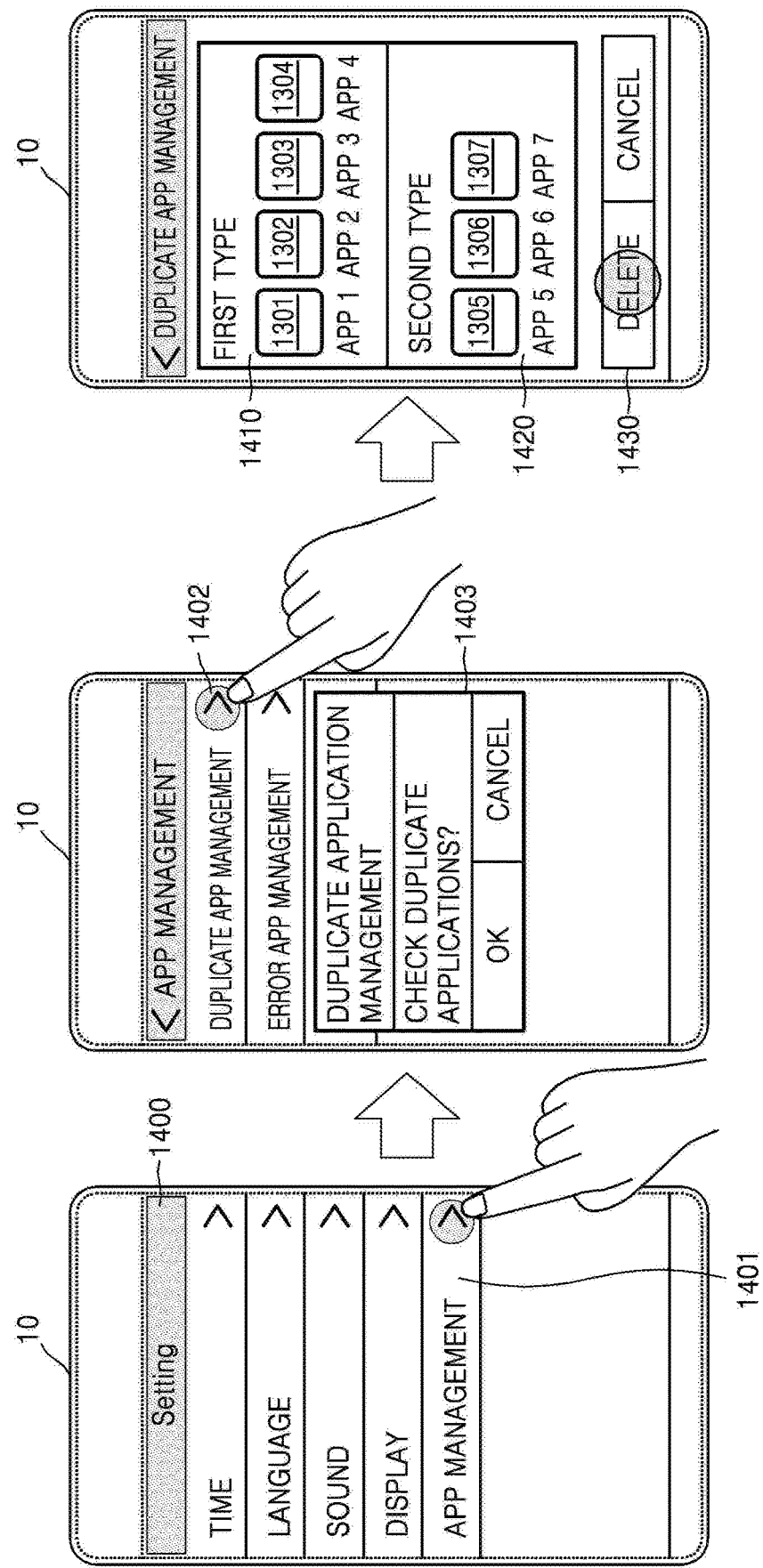
FIG. 14 is a diagram for describing a UI for managing duplicate applications, according to an exemplary embodiment.

FIG. 14 is a diagram for describing a UI for managing duplicate applications, according to an exemplary embodiment.

Referring to FIG. 14, when a configuration menu 1400 of the device 10 is executed, the device 10 may display various menu items including an app management menu 1401. When the app management menu 1401 is selected, a duplicate app management menu 1402 that is a sub menu of the app management menu 1401 is activated. The duplicate app management menu 1402 is a menu for checking for duplicate applications that are applications of the same type, among applications installed on the device 10.

When the duplicate app management menu 1402 is selected, a popup window 1403 inquiring whether to check for duplicate applications is displayed. When the user selects an "ok" button through the popup window 1403, the device 10 (the controller 110 (the monitor 111) of FIG. 2) checks for the duplicate applications among the applications installed on the device 10. By checking for the duplicate applications, applications that process documents of the same extension (for example, "*.pdf" or "*.doc") or applications that perform the same function (for example, a map function or a messenger function) may be found, as described above.

As a result of checking for the duplicate applications, the device 10 displays a UI indicating that duplicate applications corresponding to a first type 1410 are the first through fourth applications 1301 through 1304, and duplicate applications corresponding to a second type 1420 are fifth through seventh applications 1305 through 1307. Here, the first through seventh applications 1301 through 1307 are those described above with reference to FIG. 13. The first type 1410 may be PDF edit applications or PDF viewer applications, and the second type 1420 may be map applications or navigation applications.

The user selects a "delete" button 1430 to delete the duplicate applications of the first type 1410 or the duplicate applications of the second type 1420.

FIG. 15A is a diagram for describing a UI for deleting the duplicate applications of FIG. 14, according to an exemplary embodiment. The UI of FIG. 15A may be displayed after the "delete" button 1430 of FIG. 14 is selected.

When the "delete" button 1430 is selected, the device 10 (the controller 110 of FIG. 2) recommends and displays one of the first through fourth applications 1301 through 1304 that are duplicate applications corresponding to the first type 1410, which is not to be deleted, such as the first application 1301. Here, the first application 1301 is recommended based on a use history 1501 or use pattern. For example, the first application 1301 may have a higher use frequency and a higher average use time than the second through fourth applications 1302 through 1304. In other words, the first through fourth applications 1301 through 1304 of the same type are installed on the device 10, but the user mainly uses only the first application 1301.

The device 10 displays a popup window 1502 inquiring whether to delete the second through fourth applications 1302 through 1304, minus the first application 1301 that is recommended.

When the user selects an "ok" button 1503 through the popup window 1502, the second through fourth applications 1302 through 1304 are deleted from the device 10, as shown in FIG. 15A. At this time, the second through fourth applications 1302 through 1304 may be deleted by the controller 110 (the uninstaller 113) of the device 10. Meanwhile, the term "delete" used in FIGS. 13 through 15A does not only mean that an application is removed from the device 10, but may also mean an operation corresponding to one of the first through third uninstall levels described above.

FIG. 15B is a diagram for describing a UI for deleting the duplicate applications of FIG. 14, according to another exemplary embodiment. The UI of FIG. 15B may be displayed after the "delete" button 1430 of FIG. 14 is selected.

Unlike FIG. 15A wherein the first application 1301 is recommended by the device 10, the user may personally select an application to be deleted from the first through fourth applications 1301 through 1304, as shown in FIG. 15B. In this example, the user personally selects and deletes the second through fourth applications 1302 through 1304.

When the user selects an "ok" button 1511, the second through fourth applications 1302 through 1304 are deleted from the device 10, as shown in FIG. 15B. At this time, the second through fourth applications 1302 through 1304 may be deleted by the controller 110 (the uninstaller 113) of the device 10. Meanwhile, the term "delete" used in FIG. 15B does not only mean that an application is removed from the device 10, but may also mean an operation corresponding to one of the first through third uninstall levels described above.

Figure 16:
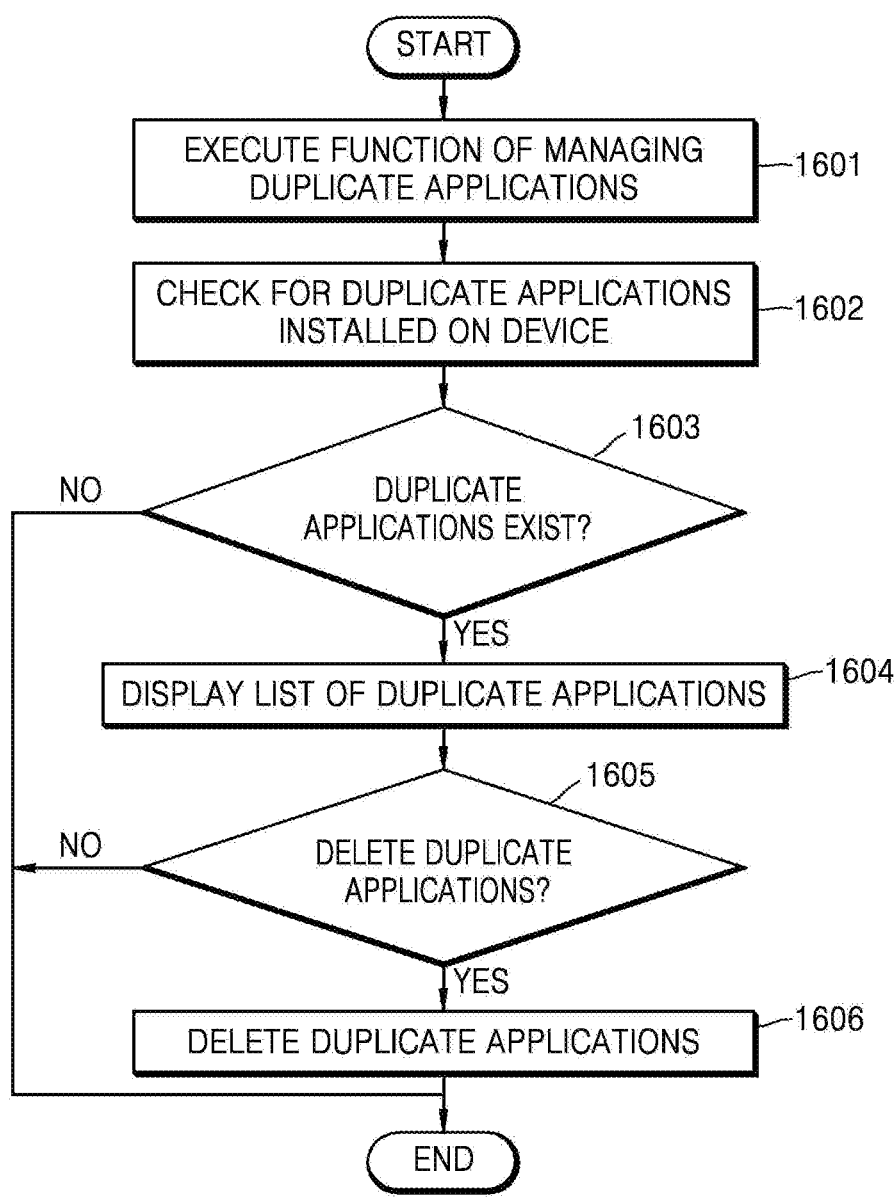
FIG. 16 is a flowchart illustrating a method of managing, by a device, duplicate applications, according to an exemplary embodiment.

FIG. 16 is a flowchart illustrating a method of managing, by the device 10, duplicate applications, according to an exemplary embodiment. Referring to FIG. 16, the method may include operations performed by the device 10 of FIG. 2 or 8 in time series.

In operation 1601, the controller 110 executes a function of managing duplicate applications. The controller 110 may execute the function when the app management menu 1401 and the duplicate app management menu 1402 are selected as described in FIG. 14.

In operation 1602, the controller 110 (the monitor 111) checks for duplicate applications installed on the device 10.

In operation 1603, the controller 110 (the determiner 112) determines whether duplication applications exist based on a result of the checking. The controller 110 may determine whether applications of the same type, such as applications that process documents of the same extension (for example, "*.pdf" or "*.doc") or applications that perform the same function (for example, a map function or a messenger function), exist by checking for the duplicate applications. If the duplicate applications exist, operation 1604 is performed. However, if the duplicate applications do not exist, the method is ended.

In operation 1604, the UI 120 displays a list of the duplicate applications. For example, as shown in FIG. 14, the UI 120 may display the first through fourth applications 1301 through 1304 that are the duplicate applications corresponding to the first type 1410, and display the fifth through seventh applications 1305 through 1307 that are duplicate applications corresponding to the second type 1420.

In operation 1605, the controller 110 determines whether to delete the duplicate applications. The deleting of the duplicate applications may be determined based on a user input. In other words, the controller 110 may determine whether to delete the duplicate applications based on whether the "delete" button 1430, 1503, or 1511 of FIG. 14, 15A, or 15B is selected. If the duplicate applications are to be deleted, operation 1606 is performed. However, if the duplicate applications are not to be deleted, the method is ended.

In operation 1606, the controller 110 (the uninstaller 113) deletes the duplicate applications from the device 10. Here, the duplicate applications to be deleted may correspond to the second through fourth applications 1302 through 1304 of FIG. 15A or 15B. Meanwhile, the term "delete" used in FIG. 16 does not only mean that an application is removed from the device 10, but may also mean an operation corresponding to one of the first through third uninstall levels described above.

FIG. 17 is a diagram for describing a UI for indicating that an error is generated while executing an application, according to an exemplary embodiment.

Referring to FIG. 17, when an X application 1701 is installed on the device 10, the user may execute the X application 1701 by selecting the X application 1701. However, there may be cases where the X application 1701 cannot be executed due to any one of various reasons, for example, due to an error in an installation file of the X application 1701, which is downloaded when the X application 1701 is installed, or due to a damage in an execution file of the X application 1701 while using the X application 1701. In other words, the device 10 may display an error message window 1710 displaying a phrase "unable to execute X application" instead of an execution screen of the X application 1701. When an installation file or an execution file of an application is damaged, the device 10 is unable to execute the application, and thus the application may be deleted from the device 10 because the application may unnecessarily waste the storage space of the device 10.

FIG. 18 is a table 1810 including error generation histories of applications, according to an exemplary embodiment.

The monitor 111 of the controller 110 of FIG. 2 may monitor the error generation histories of the applications. In other words, the monitor 111 may monitor the number of times an error is generated, a time when an error is generated, and an error generation frequency, and generate the table 1810 based on results of the monitoring. For example, the monitor 111 may monitor an error generation history of the X application 1701 such that the number of times an error is generated is 10 times total, times when errors are generated are Jan. 1, 2015, Jan. 2, 2015, Jan. 3, 2015, etc., and an error generation frequency is 10 times per week. Meanwhile, a threshold value may be pre-set with respect to each of the applications. The threshold value with respect to the X application 1701 may be a standard for determining whether the X application 1701 is an unusable (inexecutable) application in the device 10.

The device 10 may use the table 1810 to filter and manage error applications in the device 10.

Figure 19:
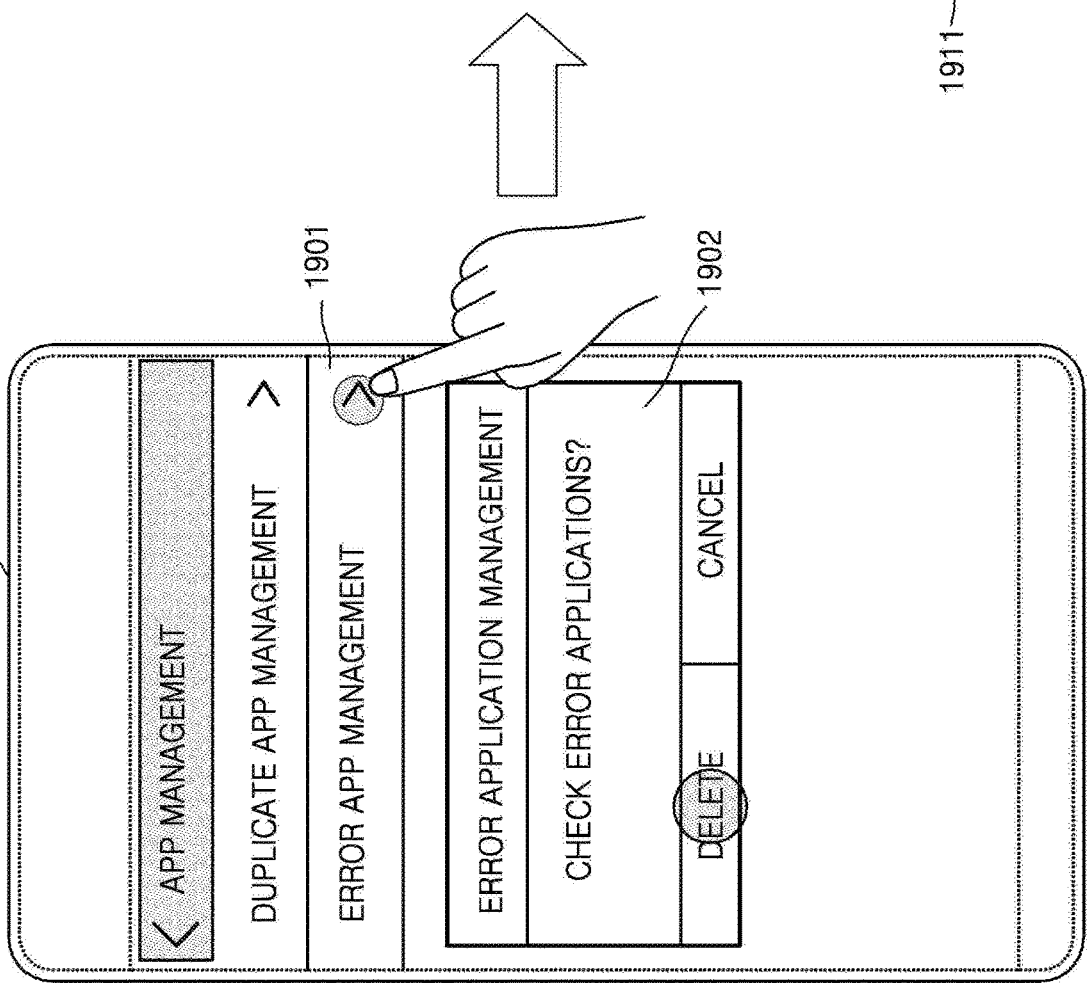
FIG. 19 is a diagram for describing a UI for managing error applications, according to an exemplary embodiment.

FIG. 19 is a diagram for describing a UI for managing error applications, according to an exemplary embodiment.

Referring to FIG. 19, the device 10 displays an error app management menu 1901 as a sub menu of the configuration menu 1400 and the app management menu 1401 of FIG. 14. The error app management menu 1901 is a menu for checking for error applications among the applications installed on the device 10.

When the error app management menu 1901 is selected, a popup window 1902 inquiring whether to check for error applications is displayed. When the user selects an "ok" button through the popup window 1902, the device 10 (the controller 110 of FIG. 2) checks for error applications among the applications installed on the device 10. At this time, the controller 110 may check for the error applications based on the table 1810 of FIG. 18. The controller 110 may filter an application (the X application 1701) having an error generation frequency (for example, 10 times per week) exceeding a threshold value (for example, 10 times per week) from the error applications in the table 1810.

The device 10 displays a popup window 1910 including information about the error generation history of the X application 1701 as a result of checking for the error applications.

When a user selects a "delete" button 1911 through the popup window 1910, the X application 1701 may be deleted from the device 10. At this time, the X application 1701 may be deleted by the controller 110 (the uninstaller 113) of the device 10. Meanwhile, the term "delete" used in FIG. 19 does not only mean that an application is removed from the device 10, but may also mean an operation corresponding to one of the first through third uninstall levels described above.

Figure 20:
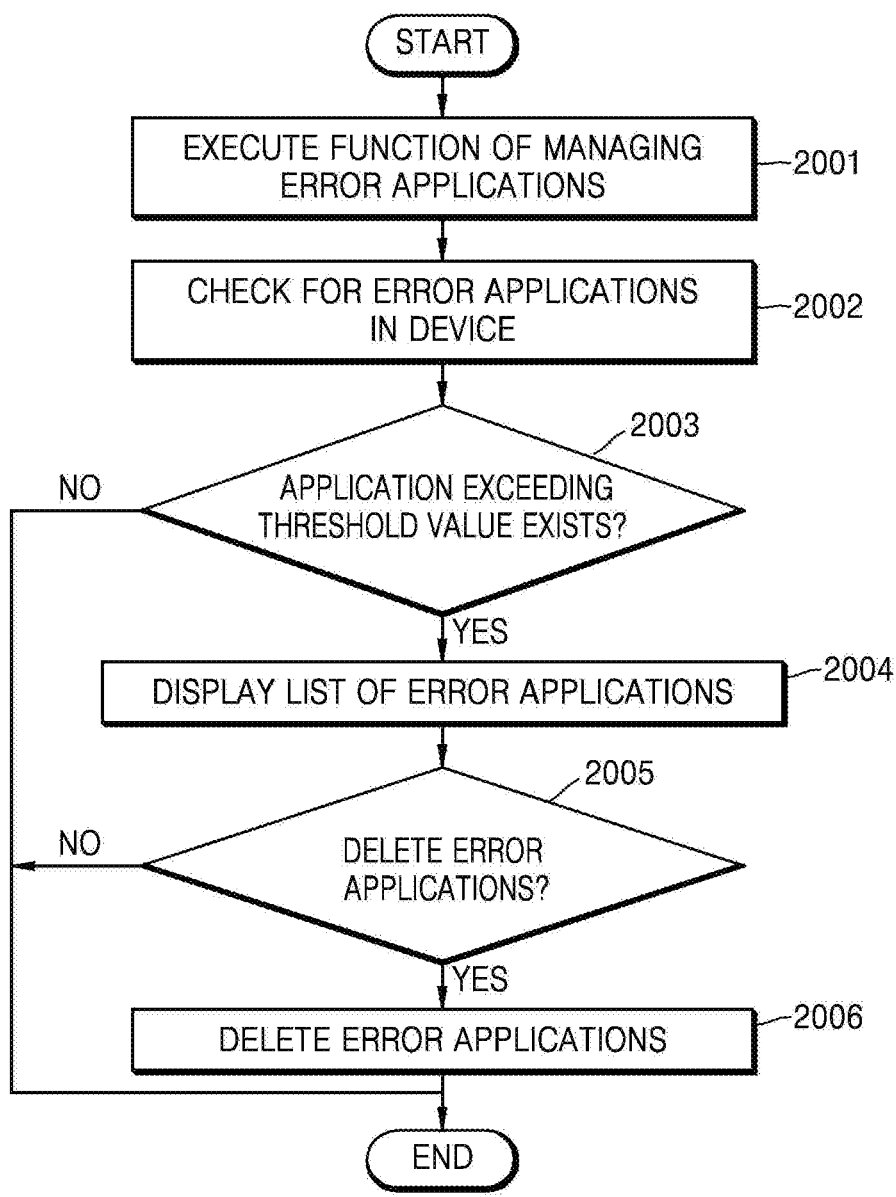
FIG. 20 is a flowchart illustrating a method of managing, by a device, error applications, according to an exemplary embodiment.

FIG. 20 is a flowchart illustrating a method of managing, by the device 10, error applications, according to an exemplary embodiment. Referring to FIG. 20, the method may include operations performed by the device 10 of FIG. 2 or 8 in time series.

In operation 2001, the controller 110 executes a function of managing error applications. The controller 110 may execute the function when the error app management menu 1901 of FIG. 19 is selected.

In operation 2002, the controller 110 checks for error applications in the device 10. Here, the controller 110 may check for the error applications based on the table 1810 of FIG. 18.

In operation 2003, the controller 110 (the determiner 112) determines whether an application exceeding a threshold value exists based on a result of the checking. The controller 110 filters and determines whether an application (the X application 1701) having an error generation frequency (for example, 10 times per week) exceeding a threshold value (for example, 10 times per week) exists from the error applications in the table 1810. If the application exceeding the threshold value exists, operation 2004 is performed. Otherwise, if the application exceeding the threshold value does not exist, the method is ended.

In operation 2004, the UI 120 displays a list of the error applications. For example, the UI 120 may display the popup window 1910 including information about the error generation history of the X application 1701, as shown in FIG. 19.

In operation 2005, the controller 110 determines whether to delete the error applications. The deleting of the error applications may be determined based on a user input. In other words, the controller 110 may determine whether to delete the error applications based on whether the "delete" button 1911 of FIG. 19 was selected. If the error applications are to be deleted, operation 2006 is performed. Otherwise, if the error applications are not to be deleted, the method is ended.

In operation 2006, the controller 110 (the uninstaller 113) deletes the error applications in the device 10. Here, the error applications to be deleted may be the X application 1701 described above with reference to FIGS. 18 and 19. Meanwhile, the term "delete" used in FIG. 20 does not only mean that an application is removed from the device 10, but may also mean an operation corresponding to one of the first through third uninstall levels described above.

Figure 21:
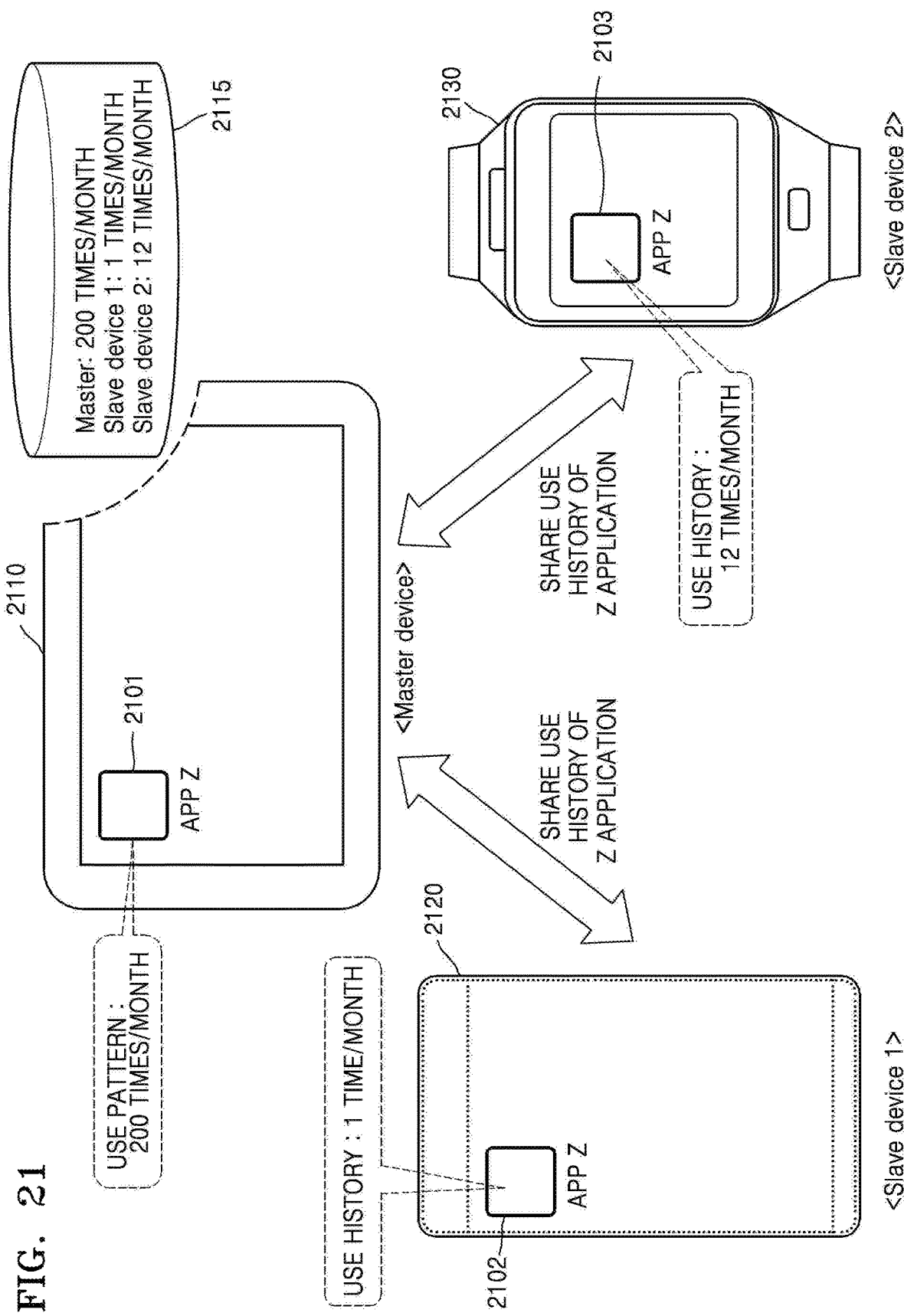
FIG. 21 is a diagram for describing managing, by a master device, of an application commonly installed on devices, according to an exemplary embodiment.

FIG. 21 is a diagram for describing managing, by a master device, of an application commonly installed on devices, according to an exemplary embodiment.

In FIG. 21, a tablet device 2110, a smart phone 2120, and a wearable device 2130 are illustrated, but such types of the devices are only examples, and are not limited thereto. Although not shown in detail, the tablet device 2110, the smart phone 2120, or the wearable device 2130 may include the hardware components described above with reference to FIG. 2 or 8.

Referring to FIG. 21, the tablet device 2110 is set as a master device, and the smart phone 2120 and the wearable device 2130 are set as slave devices. The tablet device 2110, the smart phone 2120, and the wearable device 2130 may be devices that are able to synchronize with each other by being connected to each other via a wired or wireless network. In FIGS. 1 through 12, the device 10 itself manages applications. However, in FIG. 21, several devices, i.e., the tablet device 2110, the smart phone 2120, and the wearable device 2130, which are connected to each other, integrally manage an application.

Z applications 2101 through 2103, which are the same application, are respectively installed on the tablet device 2110, the smart phone 2120, and the wearable device 2130. The Z applications 2101 through 2103 may be able to synchronize with each other.

The smart phone 2120 corresponds to a first slave device, and transmits information about a use history (for example, 1 time per month) of the Z application 2102 in the smart phone 2120 to the tablet device 2110 (a master device). Similarly, the wearable device 2130 corresponds to a second slave device, and transmits information about a use history (for example, 12 times per month) of the Z application 2103 in the wearable device 2130 to the tablet device 2110 (the master device).

The tablet device 2110 (the master device) manages not only information about a use history (for example, 200 times per month) of the Z application 2101 in the tablet device 2110, but also the received information about the use history of the Z application 2102 and the use history of the Z application 2103. In other words, the tablet device 2110 (the master device) stores and manages information about use histories of the tablet device 2110, the smart phone 2120, and the wearable device 2130 in a database 2115. Here, the database 2115 may correspond to the memory 1060 of FIG. 8. The information about the use histories of the smart phone 2120 and the wearable device 2130, which are the first and second slave devices, stored in the database 2115 of the tablet device 2110 (the master device) may include information described above with reference to FIG. 3.

The tablet device 2110 (the master device) may manage uninstallation of the smart phone 2120 (the first slave device) described above with reference to FIGS. 1 through 12, based on the information about the use history of the Z application 2102. Also, the tablet device 2110 (the master device) may manage uninstallation of the wearable device 2130 (the second slave device) described above with reference to FIGS. 1 through 12, based on the information about the use history of the Z application 2103. In other words, a master device may manage applications installed on a slave device instead of the slave device. Meanwhile, the tablet device 2110 (the master device) may also manage the Z application 2101.

Figure 22:
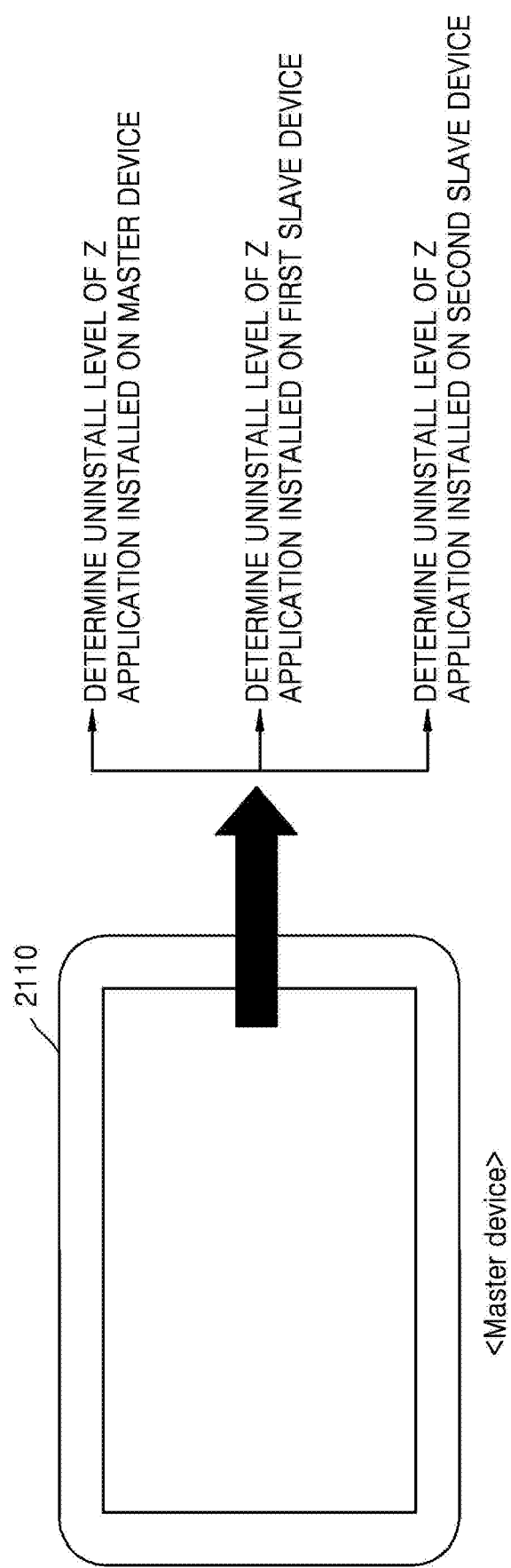
FIG. 22 is a diagram for describing managing, by a master device, an uninstall level of an application installed on each slave device, according to an exemplary embodiment.

FIG. 22 is a diagram for describing managing, by a master device, an uninstall level of an application installed on each slave device, according to an exemplary embodiment.

Referring to FIG. 22, a controller (for example, the controller 110 of FIG. 2) of the tablet device 2110 (the master device) determines an uninstall level of each of the Z applications 2101 through 2103 based on the information about the use history (for example, 200 times per month) of the Z application 2102, about the use history (for example, 1 time per month) of the Z application 2102, and about the use history (for example, 12 times per month) of the Z application 2103 described above with reference to FIG. 21.

For example, the tablet device 2110 (the master device) may determine that the Z application 2101 does not correspond to any uninstall level, the Z application 2102 corresponds to the third uninstall level, and the Z application 2103 corresponds to the first uninstall level.

Figure 23:
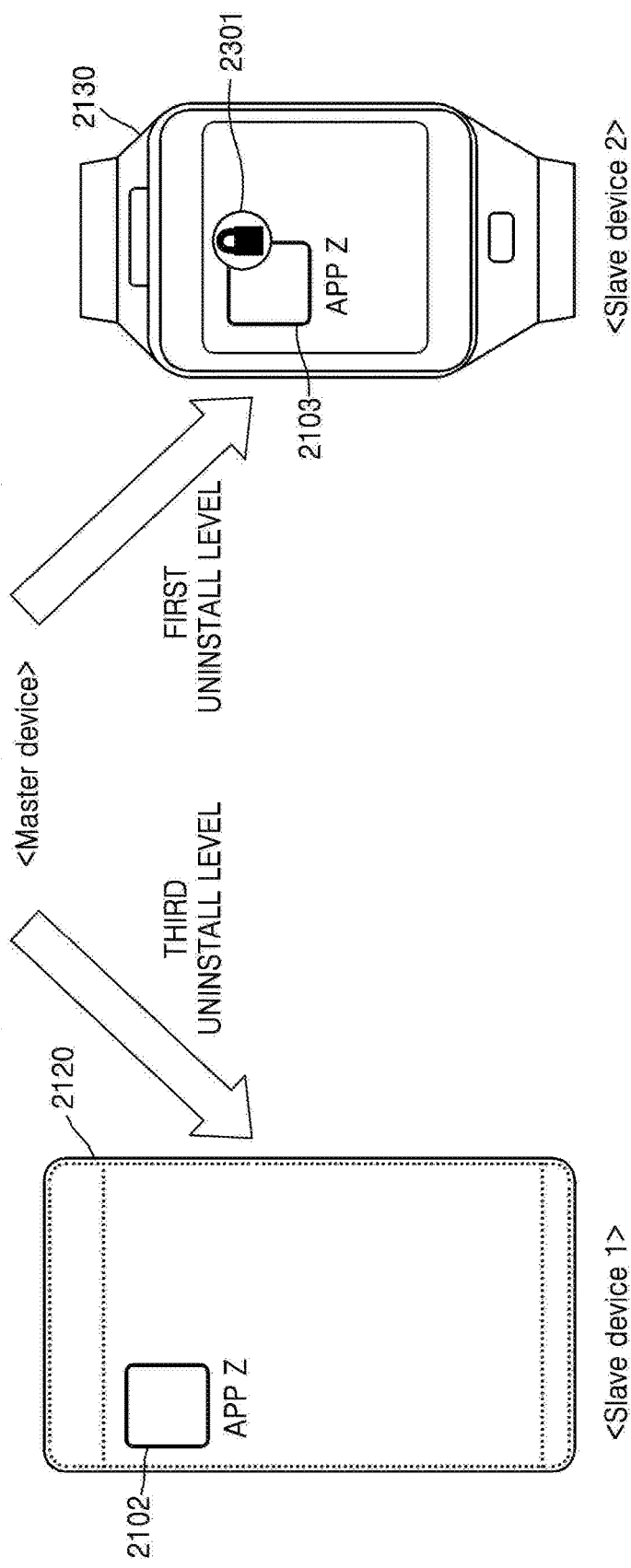
FIG. 23 is a diagram for describing controlling, by a master device, uninstallation of an application installed on a slave device, according to an exemplary embodiment.

FIG. 23 is a diagram for describing controlling, by a master device, uninstallation of an application installed on a slave device, according to an exemplary embodiment.

Referring to FIG. 23, because the Z application 2102 corresponds to the third uninstall level, the tablet device 2110 (the master device) may control uninstallation of the Z application 2102 by commanding the smart phone 2120 (the first slave device) to perform the third uninstall operation on the Z application 2102. Also, because the Z application 2103 corresponds to the first uninstall level, the tablet device 2110 (the master device) may control uninstallation of the Z application 2103 by commanding the wearable device 2130 (the second slave device) to perform the first uninstall operation on the Z application 2103. Meanwhile, such controls may be performed by the controller (for example, the controller 110 of FIG. 2) of the tablet device 2110 (the master device). The wearable device 2130 inserts and displays a padlock symbol 2301 on an icon of the Z application 2103 to indicate that the Z application 2103 corresponds to the first uninstall level.

Figure 24:
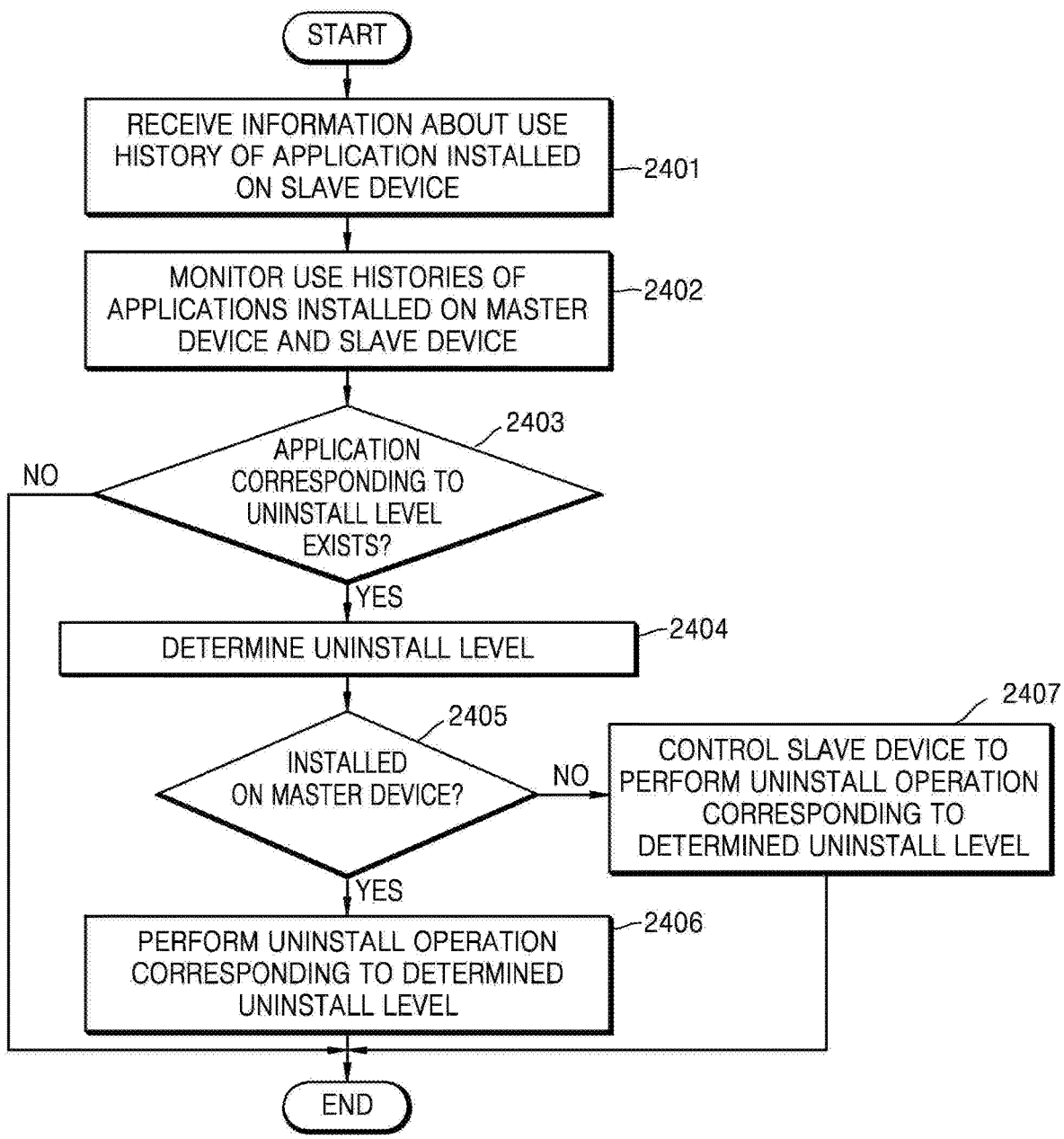
FIG. 24 is a flowchart illustrating a method of managing, by a master device, an application commonly installed on the master device and a slave device, according to an exemplary embodiment.

FIG. 24 is a flowchart illustrating a method of managing, by a master device, an application commonly installed on the master device and a slave device, according to an exemplary embodiment. The method of FIG. 24 will be described with reference to FIGS. 21 through 23.

In operation 2401, the master device (the tablet device 2110) receives information about a use history of an application (the Z application 2102 or 2103) installed on the slave device (the smart phone 2120 or the wearable device 2130).

In operation 2402, the master device (the tablet device 2110) monitors a use history of an application (the Z application 2101) installed on the master device (the tablet device 2110), and the use history of the application (the Z application 2102 or 2103) installed on the slave device (the smart phone 2120 or the wearable device 2130).

In operation 2403, the master device (the tablet device 2110) determines whether an application corresponding to an uninstall level exists among the applications (the Z application 2101 and the Z application 2102 or 2103). In other words, the master device (the tablet device 2110) determines whether there is an application corresponding to any one of the first through third uninstall levels among the applications (the Z application 2101 and the Z application 2102 or 2103). If the application corresponding to the uninstall level exists, operation 2404 is performed. If not, the method is ended.

In operation 2404, the master device (the tablet device 2110) determines the uninstall level of the application (the Z application 2101, 2102, or 2103) based on a result of the determining in operation 2403.

In operation 2405, the master device (the tablet device 2110) determines whether the application of which the uninstall level is determined is the application installed on the master device (the tablet device 2110). If the application of which the uninstall level is determined is installed on the master device (the tablet device 2110), operation 2406 is performed. If not, operation 2407 is performed.

In operation 2406, the master device (the tablet device 2110) performs an uninstall operation corresponding to the determined uninstall level on the application (the Z application 2101) installed on the master device (the tablet device 2110).

In operation 2407, the master device (the tablet device 2110) controls the slave device (the smart phone 2120 or the wearable device 2130) to perform an uninstall operation corresponding to the determined uninstall level on the application (the Z application 2102 or 2103) installed on the slaved device.

Meanwhile, the monitoring, the determining of the uninstall level, and the controlling of the slave device, which are performed by the master device (the tablet device 2110), described above may be performed by a controller (for example, the controller 110 of FIG. 2) of the master device (the tablet device 2110).

Figure 25:
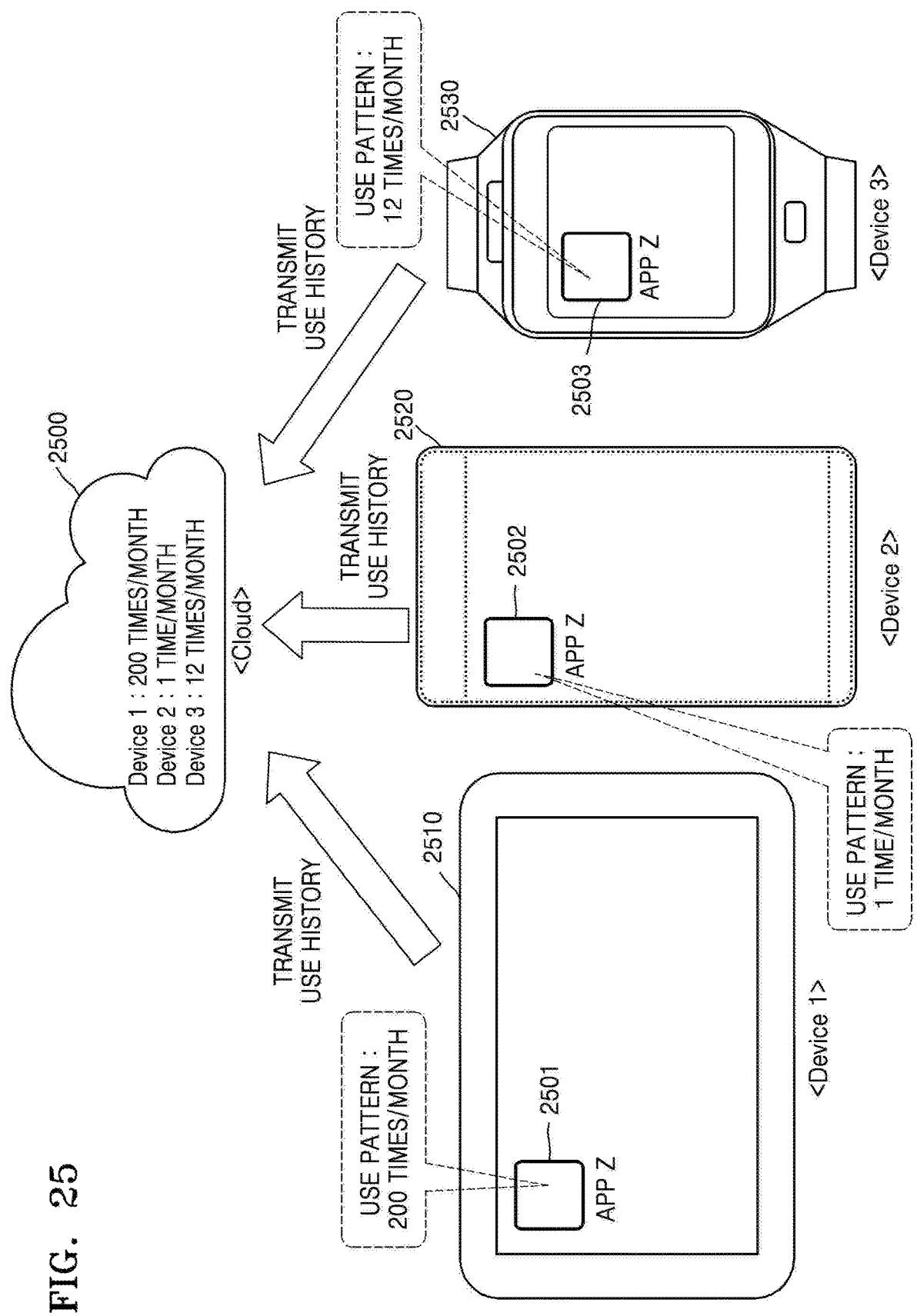
FIG. 25 is a diagram for describing managing, by a cloud, an application commonly installed on devices, according to an exemplary embodiment.

FIG. 25 is a diagram for describing managing, by a cloud 2500, an application commonly installed on devices, according to an exemplary embodiment.

Referring to FIG. 25, a tablet device 2510 (a first device), a smart phone 2520 (a second device), and a wearable device 2530 (a third device) are illustrated, but such types of devices are only examples and are not limited thereto. Meanwhile, although not illustrated in detail in FIG. 25, the cloud 2500, the tablet device 2510, the smart phone 2520, or the wearable device 2530 may include the hardware components described above with reference to FIG. 2 or 8.

Unlike FIG. 21, in FIG. 25, a master device and slave devices are not set, but the cloud 2500 integrally manages applications installed on the tablet device 2510, the smart phone 2520, and the wearable device 2530. The cloud 2500, the tablet device 2510, the smart phone 2520, and the wearable device 2530 may be devices that are able to synchronize with each other by being connected to each other via a wired or wireless network.

Z applications 2501 through 2503 are installed respectively on the tablet device 2510, the smart phone 2520, and the wearable device 2530. The Z applications 2501 through 2503 may be able to synchronize with each other.

The tablet device 2510 transmits information about a use history (for example, 200 times per month) of the Z application 2501 in the tablet device 2510 to the cloud 2500. Also, the smart phone 2520 transmits information about a use history (for example, 1 time per month) of the Z application 2502 in the smart phone 2520 to the cloud 2500. Similarly, the wearable device 2530 transmits information about a use history (for example, 12 times per month) of the Z application 2503 in the wearable device 2530 to the cloud 2500. In other words, unlike FIG. 21, the information about the use histories may be transmitted to the cloud 2500.

The cloud 2500 stores and manages information about the use histories of the tablet device 2510, the smart phone 2520, and the wearable device 2530. Here, the information about the use histories of the tablet device 2510, the smart phone 2520, and the wearable device 2530, which are stored in the cloud 2500, may include the information described above with reference to FIG. 3.

The cloud 2500 may manage uninstallation described above with reference to FIGS. 1 through 12 based on the information about the use history of each of the Z applications 2501 through 2503. In other words, the cloud 2500 may manage applications installed on the tablet device 2510, the smart phone 2520, and the wearable device 2530, which are connected to the cloud 2500.

Figure 26:
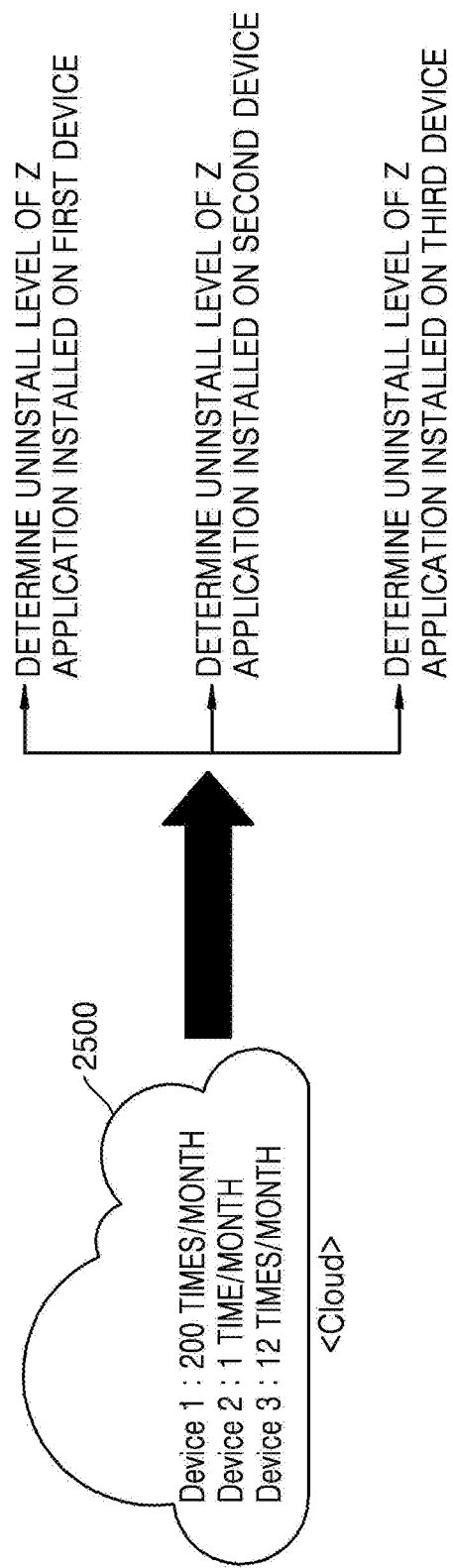
FIG. 26 is a diagram for describing managing, by a cloud, an uninstall level of an application installed on each of devices, according to an exemplary embodiment.

FIG. 26 is a diagram for describing managing, by the cloud 2500, an uninstall level of an application installed on each of devices, according to an exemplary embodiment.

Referring to FIG. 26, the cloud 2500 determines an uninstall level of each of the Z applications 2501 through 2503 based on the information about the use history (for example, 200 times per month) of the Z application 2501 installed on the tablet device 2510 (the first device), about the use history (for example, 1 time per month) of the Z application 2502 installed on the smart phone 2520 (the second device), and about the use history (for example, 12 times per month) of the Z application 2503 installed on the wearable device 2530 (the third device).

For example, the cloud 2500 may determine that there is no uninstall level corresponding to the Z application 2501, the Z application 2502 corresponds to the third uninstall level, and the Z application 2503 corresponds to the first uninstall level.

Figure 27:
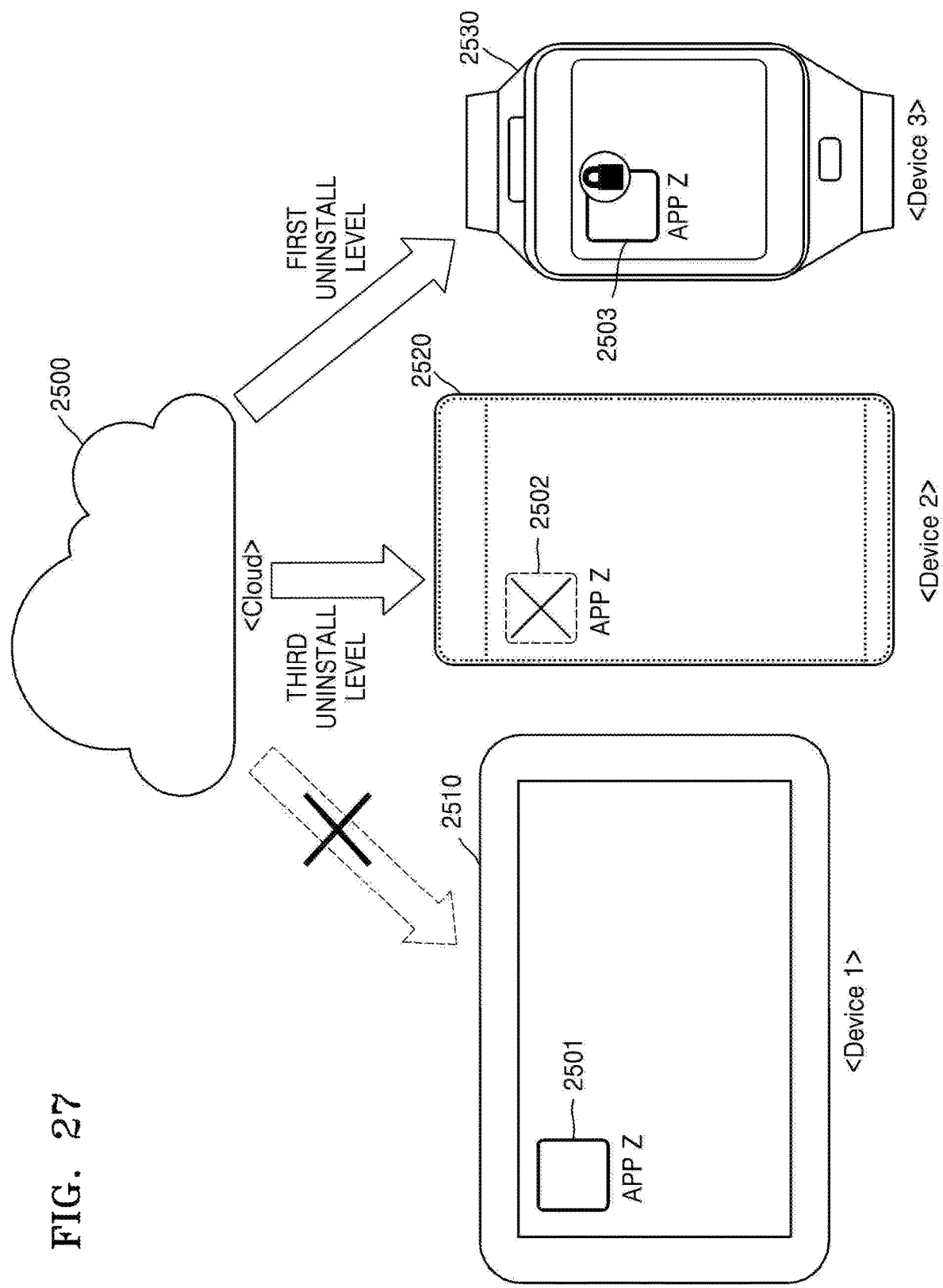
FIG. 27 is a diagram for describing controlling, by a cloud, uninstallation of an application installed on each of devices, according to an exemplary embodiment.

FIG. 27 is a diagram for describing controlling, by the cloud 2500, uninstallation of an application installed on each of devices, according to an exemplary embodiment.

Referring to FIG. 27, because there is no uninstall level corresponding to the Z application 2501, the cloud 2500 may not control the tablet device 2510 (the first device). However, because the Z application 2502 corresponds to the third uninstall level, the cloud 2500 may control uninstallation of the Z application 2502 by commanding the smart phone 2520 (the second device) to perform the third uninstall operation on the Z application 2502. Also, because the Z application 2503 corresponds to the first uninstall level, the cloud 2500 may control uninstallation of the Z application 2503 by commanding the wearable device 2530 (the third device) to perform the first uninstallation operation on the Z application 2503.

Figure 28:
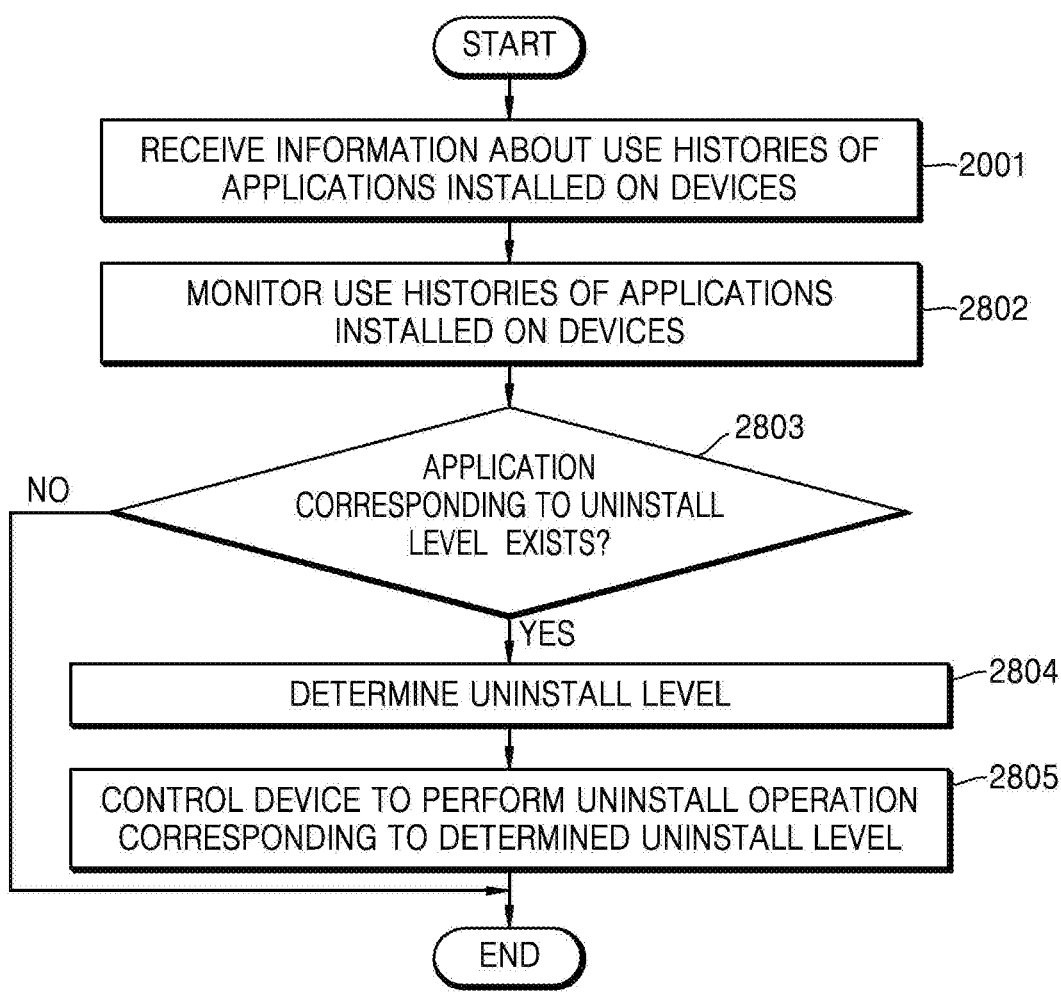
FIG. 28 is flowchart illustrating a method of managing, by a cloud, applications installed on devices, according to an exemplary embodiment.

FIG. 28 is flowchart illustrating a method of managing, by the cloud 2500, applications installed on devices, according to an exemplary embodiment. The method of FIG. 28 will be described with reference to FIGS. 25 through 27.

In operation 2801, the cloud 2500 receives information about use histories of the applications (the Z applications 2501 through 2503) installed on the devices (the tablet device 2510, the smart phone 2520, and the wearable device 2530).

In operation 2802, the cloud 2500 monitors the use histories of the applications (the Z applications 2501 through 2503) installed on the devices (the tablet device 2510, the smart phone 2520, and the wearable device 2530).

In operation 2803, the cloud 2500 determines whether an application corresponding to an uninstall level exists among the applications (the Z applications 2501 through 2503). In other words, the cloud 2500 determines whether there is an application corresponding to any one of the first through third uninstall levels, among the applications (the Z applications 2501 through 2503). If the application corresponding to the uninstall level exists, operation 2804 is performed. If not, the method is ended.

In operation 2804, the cloud 2500 determines the uninstall level of the application (the Z application 2501, 2502, or 2503) based on a result of the determining of operation 2803.

In operation 2805, the cloud 2500 controls the device (the tablet device 2510, the smart phone 2520, or the wearable device 2530) to perform an uninstall operation corresponding to the determined uninstall level on the application (the Z application 2501, 2502, or 2503).

Figure 29:
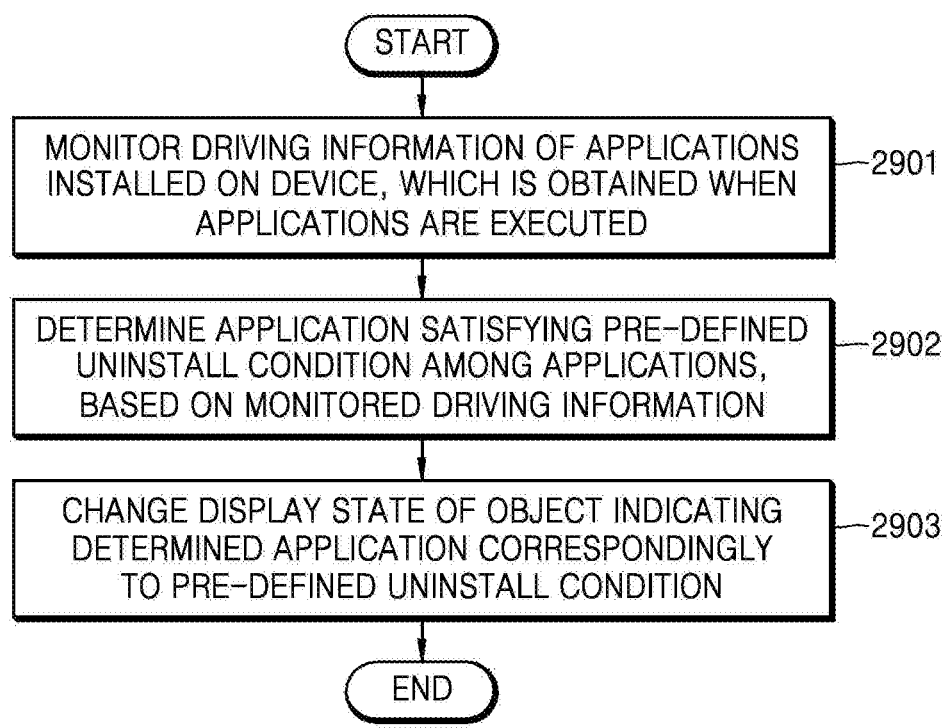
FIG. 29 is a flowchart illustrating a method of managing applications installed on a device, according to an exemplary embodiment.

FIG. 29 is a flowchart illustrating a method of managing applications installed on a device, according to an exemplary embodiment. The method of FIG. 29 may be processed and performed by the device 10 (or the tablet device 2110 or the cloud 2500) described above with reference to FIGS. 1 through 28. Thus, details described above with reference to FIGS. 1 through 28 may also be applied to the method of FIG. 29 even if omitted.

In operation 2901, the controller 110 of the device 10 monitors driving information of applications installed on the device 10, which is obtained when the applications are executed. Here, the driving information may include information about use histories of the applications, which is described above with reference to FIGS. 1 through 12, information indicating duplicate applications, which is described above with reference to FIGS. 13 through 16, or information about error generation histories of the applications, which is described above with reference to FIGS. 17 through 20.

In operation 2902, the controller 110 of the device 10 determines an application satisfying a pre-defined uninstall condition among the applications, based on the monitored driving information. Here, the pre-defined uninstall condition may include a condition in which an application is unused for a pre-set threshold period of time, a condition in which an unused state of an application is repeated a threshold number of times or more until a pre-set point of time, a condition in which an application is unused when a location of the device 10 is outside a pre-set range of distance, or a condition in which an application is unshared with another device for a threshold period of time. Moreover, the pre-defined uninstall condition may include a condition for determining duplicate applications or conditions for determining an error application. In other words, the controller 110 may determine an application corresponding to the first uninstall level, the second uninstall level, or the third uninstall level, and also determine duplicate applications or an error application.

In operation 2903, the UI 120 of the device 10 changes a display state of an object indicating the determined application correspondingly to the pre-defined uninstall condition. The UI 120 may change the display state of the object indicating the determined application to correspond to the first uninstall level, the second uninstall level, or the third uninstall level. Also, when at least one of duplicate applications is deleted or an error application is deleted, the UI 120 may no longer display the deleted at least one of the duplicate application or the deleted error application.

As described above, according to the one or more of the above exemplary embodiments, applications installed on a device, such as a smart phone or a mobile phone, are managed such that a display state of an application that is seldom used or not used at all by a user is changed in stages or data and information related to such an application is deleted in stages, thereby efficiently managing a limited storage capacity of the device or enabling the user to easily manage the applications.

The exemplary embodiments can be written as computer programs and can be implemented in general-use digital computers that execute the programs using a computer-readable recording medium. Examples of the computer-readable recording medium include magnetic storage media (e.g., ROM, floppy disks, hard disks, etc.), optical recording media (e.g., CD-ROMs, or DVDs), etc.

While one or more exemplary embodiments have been described with reference to the figures, it will be understood by those of ordinary skill in the art that various changes in form and details may be made therein without departing from the spirit and scope as defined by the following claims.

What is claimed is:

1. A device for managing applications installed on the device, the device comprising:
    a display interface; and
    a processor configured to:
        determine a plurality of types of duplicate applications among the applications installed on the device based on at least one of an extension of a file which is processed by each application and a function of each application;
        control the display interface to display a plurality of lists of the determined duplicate applications, wherein each of the plurality of lists comprises duplicate applications of a same type;
        determine a list among the plurality of lists of the determined duplicate applications; and
        uninstall at least one duplicate application from among duplicate applications of the determined list, based on a user input.

2. The device of claim 1 further comprising a user input interface which is configured to receive the user input to select the at least one duplicate application with respect to the determined list.

3. The device of claim 1, wherein the processor is further configured to:
    recommend an application from among the duplicate applications of the determined list based on a use history or use pattern;
    display the recommended application with the determined list; and
    uninstall the at least one duplicate application other than the recommended application, in response to a user input interface receiving a request for uninstalling.

4. The device of claim 1 further comprising a user input interface configured to receive a request for managing duplicate applications,
    wherein the processor is configured to determine the duplicate applications among the applications, in response to the user input interface receiving the request.

5. The device of claim 1, wherein the processor is further configured to:
    determine the at least one duplicate application which satisfies an uninstall condition from among the duplicate applications of the determined list, and
    the uninstall condition comprises a condition in which applications process a file of a same extension or applications perform a same function.

6. The device of claim 1, wherein the processor is further configured to:
    obtain driving information of the applications in response to the applications being executed, the driving information comprising a use history of each of the applications;
    determine applications satisfying an uninstall condition, among the applications, based on the driving information; and
    control the display interface to change a display of an object indicating the determined applications, based on the uninstall condition.

7. The device of claim 6, wherein the use history of each of the applications comprises use frequency of an application during a pre-set period of time.

8. The device of claim 7, wherein the uninstall condition comprises stages corresponding to the use history, and
    the processor is further configured to determine a stage from among the stages of the application determined to satisfy the uninstall condition and to perform an operation corresponding to the determined stage.

9. The device of claim 8, wherein the display interface is further configured to change the object to a visual representation of a different type based on the determined stage.

10. The device of claim 7, wherein the uninstall condition comprises at least one among a condition in which an application is unused for a pre-set period of time, a condition in which an application is used below a threshold number of times until a preset point in time, a condition in which the device is located outside a range of distance, and a condition in which an application is unshared with another device for a pre-set period of time.

11. A method for managing applications installed on a device, the method comprising:
    determining a plurality of types of duplicate applications among the applications installed on the device based on at least one of an extension of a file which is processed by each application and a function of each application;
    displaying a plurality of lists of the determined duplicate applications, wherein each of the plurality of lists comprises duplicate applications of a same type;
    determining a list among the plurality of lists of the determined duplicate applications; and
    uninstalling at least one duplicate application from among duplicate applications of the determined list, based on a user input.

12. The method of claim 11 further comprising receiving the user input to select the at least one duplicate application with respect to the determined list.

13. The method of claim 11 wherein the displaying of the list comprises:
    recommending an application from among the duplicate applications of the determined list based on a use history or use pattern; and
    displaying the recommended application with the determined list, and
    wherein the uninstalling of the at least one duplicate application comprises
    uninstalling the at least one duplicate application other than the recommended application, in response to receiving a request for uninstalling.

14. The method of claim 11, wherein the determining of the duplicate applications comprises:
    receiving a request for managing duplicate applications; and
    determining the duplicate applications among the applications, in response to receiving the request.

15. The method of claim 11 further comprising:
determining the at least one duplicate application which satisfies an uninstall condition from among the duplicate applications of the determined list, and
the uninstall condition comprises a condition in which applications process a file of a same extension or applications perform a same function.

16. The method of claim 11 further comprising:
obtaining driving information of the applications in response to the applications being executed, the driving information comprising a use history of each of the applications;
determining applications satisfying an uninstall condition, among the applications, based on the driving information; and
changing a display of an object indicating the determined applications, based on the uninstall condition.

17. The method of claim 16, wherein the use history of each of the applications comprises use frequency of an application during a pre-set period of time.

18. The method of claim 17, wherein the uninstall condition comprises stages corresponding to the use history, and
the determining of the applications satisfying the uninstall condition comprises
determining a stage from among the stages of the application determined to satisfy the uninstall condition and to perform an operation corresponding to the determined stage.

19. The method of claim 18, wherein the changing of the display of the object comprises:
changing the object to a visual representation of a different type based on the determined stage.

20. A non-transitory computer-readable storage medium storing a program comprising instructions to cause a computer to perform a method for managing applications installed on a device, the method comprising:
determining a plurality of types of duplicate applications among the applications installed on the device based on at least one of an extension of a file which is processed by each application and a function of each application;
displaying a plurality of lists of the determined duplicate applications, wherein each of the plurality of lists comprises duplicate applications of a same type;
determining a list among the plurality of lists of the determined duplicate applications; and
uninstalling at least one duplicate application from among duplicate applications of the determined list, based on a user input.

* * * * *